United States Patent
Yoshino et al.

(10) Patent No.: US 11,803,655 B2
(45) Date of Patent: Oct. 31, 2023

(54) RETRIEVAL SYSTEM, RETRIEVAL DEVICE AND RETRIEVAL METHOD

(71) Applicant: HITACHI, LTD., Tokyo (JP)

(72) Inventors: Masayuki Yoshino, Tokyo (JP); Keisei Fujiwara, Tokyo (JP)

(73) Assignee: HITACHI, LTD., Tokyo (JP)

(*) Notice: Subject to any disclaimer, the term of this patent is extended or adjusted under 35 U.S.C. 154(b) by 248 days.

(21) Appl. No.: 17/209,389

(22) Filed: Mar. 23, 2021

(65) Prior Publication Data

US 2021/0334400 A1    Oct. 28, 2021

(30) Foreign Application Priority Data

Apr. 27, 2020  (JP) ................................ 2020-077986

(51) Int. Cl.
| | |
|---|---|
| *G06F 21/62* | (2013.01) |
| *G06F 21/57* | (2013.01) |
| *G06F 21/60* | (2013.01) |
| *G06F 21/78* | (2013.01) |

(52) U.S. Cl.
CPC .......... *G06F 21/6227* (2013.01); *G06F 21/57* (2013.01); *G06F 21/602* (2013.01); *G06F 21/78* (2013.01)

(58) Field of Classification Search
CPC .... G06F 21/6227; G06F 21/57; G06F 21/602; G06F 21/78
See application file for complete search history.

(56) References Cited

U.S. PATENT DOCUMENTS

| | | | |
|---|---|---|---|
| 2016/0299924 A1* | 10/2016 | Fujimoto | G06F 16/2455 |
| 2016/0335450 A1* | 11/2016 | Yoshino | G06F 21/6227 |
| 2017/0103083 A1* | 4/2017 | von Thienen | G06F 16/2228 |

OTHER PUBLICATIONS

Extended European Search Report dated Sep. 15, 2021 for European Patent Application No. 21164511.4.
Fuhry et al., "HardIDX: Practical and Secure Index with SGX", arxiv.org, Cornell University Library, 201 Olin Library Cornell University Ithaca, NY 14853, Mar. 14, 2017, XP080756679, DOI: 10.1007/978-3-319-61176-1_22.

(Continued)

*Primary Examiner* — Ayoub Alata
(74) *Attorney, Agent, or Firm* — Volpe Koenig

(57) ABSTRACT

A retrieval system includes a first management unit which stores, in a first storage area that cannot be browsed by an administrator of a provider machine, management information in which an encrypted retrieval keyword used for a retrieval performed by the provider machine, and an encrypted ID, which is associated with the encrypted retrieval keyword, are associated and, of the management information, decrypts, and then once again encrypts, the encrypted retrieval keyword corresponding to the encrypted query from a browsing machine and the encrypted ID corresponding to the encrypted retrieval keyword, and a second management unit which stores, in a second storage area, index information in which the encrypted retrieval keyword used for the retrieval performed by the provider machine, and one or more encrypted IDs associated with the encrypted retrieval keyword, are associated, and, of the index information, updates the encrypted retrieval keyword and the encrypted ID.

10 Claims, 16 Drawing Sheets

(56) References Cited

OTHER PUBLICATIONS

Sasy, S., et al., "ZeroTrace: Oblivious Memory Primitives from Intel SGX," 25th Annual Network and Distributed System Security (NDSS) Symposium 2018, Feb. 18-21, 2018, San Diego, CA USA, 15 pgs.

Naveed, M., et al., "Inference Attacks on Property-Preserving Encrypted Databases," ACM Conference on Computer and Communications Security 2015 (ACM CCS 2015), Oct. 12-16, 2015, Denver, CO, USA, 13 pgs.

European Office Action dated May 3, 2023 for European Patent Application No. 21164511.4.

Cui Shujie et al., "Preserving Access Pattern Privacy in SGX-Assisted Encrypted Search", 2018 27th International Conference on Computer Communication and Networks (ICCCN), IEEE, Jul. 30, 2018 (Jul. 30, 2018), pp. 1-9, XP033418003, DOI: 10.1109/ICCCN.2018.8487338.

Thang Hoang et al, "Hardware-Supposed ORAM in Effect: Practical Oblivious Search and Update on Very Large Dataset", IACR, International Association for Cryptologic Research, vol. 20180307:181925 Mar. 5, 2018 (Mar. 5, 2018), pp. 1-28, XP061025383, Retrieved from the Internet: URL:http://eprint.iacr.org/2018/247.pdf (retrieved on Mar. 5, 2018).

\* cited by examiner

FIG. 3

PLAINTEXT DATABASE 300

| ID | NAME | INSURER NUMBER | DATE OF MEDICAL EXAMINATION | MEDICAL INSTITUTION CODE | DISEASE CODE |
|---|---|---|---|---|---|
| 1 | ICHIRO TANAKA | 0112345678 | 20140101 | 2410993 | 8840652 |
| 2 | JIRO YAMADA | 3323456789 | 20140202 | 5111067 | 4731202 |
| 3 | ICHIRO TANAKA | 0112345678 | 20140303 | 4802965 | 2209005 |
| 4 | JIRO YAMADA | 3323456789 | 20140404 | 5111067 | 8834244 |
| 5 | HANAKO SATO | 3356789012 | 20140505 | 1305457 | 8832345 |
| ... | ... | ... | ... | ... | ... |

FIG. 4

ENCRYPTED DATABASE 400

| ID | NAME | INSURER NUMBER | DATE OF MEDICAL EXAMINATION | MEDICAL INSTITUTION CODE | DISEASE CODE |
|---|---|---|---|---|---|
| 1 | E(ICHIRO TANAKA) | E(0112345678) | E(20140101) | E(2410993) | E(8840652) |
| 2 | E(JIRO YAMADA) | E(3323456789) | E(20140202) | E(5111067) | E(4731202) |
| 3 | E(ICHIRO TANAKA) | E(0112345678) | E(20140303) | E(4802965) | E(2209005) |
| 4 | E(JIRO YAMADA) | E(3323456789) | E(20140404) | E(5111067) | E(8834244) |
| 5 | E(HANAKO SATO) | E(3356789012) | E(20140505) | E(1305457) | E(8832345) |
| ... | ... | ... | ... | ... | ... |

FIG. 5

ENCRYPTED DATABASE RETRIEVAL RESULT 500

| NAME | DATE OF MEDICAL EXAMINATION | MEDICAL INSTITUTION CODE | DISEASE CODE |
|---|---|---|---|
| E(JIRO YAMADA) | E(20140202) | E(5111067) | E(4731202) |
| E(JIRO YAMADA) | E(20140404) | E(5111067) | E(8834244) |

FIG. 6

RETRIEVAL RESULT 600

| NAME | DATE OF MEDICAL EXAMINATION | MEDICAL INSTITUTION CODE | DISEASE CODE |
|---|---|---|---|
| JIRO YAMADA | 20140202 | 5111067 | 4731202 |
| JIRO YAMADA | 20140404 | 5111067 | 8834244 |

FIG. 7

PLAINTEXT INDEX 700

| INSURER NUMBER (RETRIEVAL KEYWORD) | ID (RETRIEVAL RESULT) |
|---|---|
| 0112345678 | 1, 3, 8 |
| 3323456789 | 12, 13 |
| 0234567890 | 10 |
| 0145678901 | 2, 4 |
| 3356789012 | 25 |
| 0378901234 | 6, 7 |
| ... | ... |

FIG. 8

ENCRYPTED INDEX 800

| INSURER NUMBER (RETRIEVAL KEYWORD) | ID (RETRIEVAL RESULT) |
|---|---|
| E(0112345678) | E(1, 3, 8) |
| E(3323456789) | E(12, 13) |
| E(0234567890) | E(10) |
| E(0145678901) | E(2, 4) |
| E(3356789012) | E(25) |
| E(0378901234) | E(6, 7) |
| ... | ... |

FIG. 14

ENCRYPTED INDEX MANAGEMENT TABLE 1400

| INSURER NUMBER | ID | POSITION |
|---|---|---|
| E(0112345678) | E(1, 3, 8) | 7 |
| E(3323456789) | E(12, 13) | 4 |
| E(0234567890) | E(10) | 3 |
| E(0145678901) | E(2,4) | 2 |
| E(3356789012) | E(25) | 5 |
| E(0378901234) | E(6,7) | 1 |
| ... | ... | 6 |

FIG. 15

SUBSTITUTION TABLE 1500

| INSURER NUMBER | ID | path |
|---|---|---|
|  |  |  |
|  |  |  |
|  |  |  |
|  |  |  |
|  |  |  |

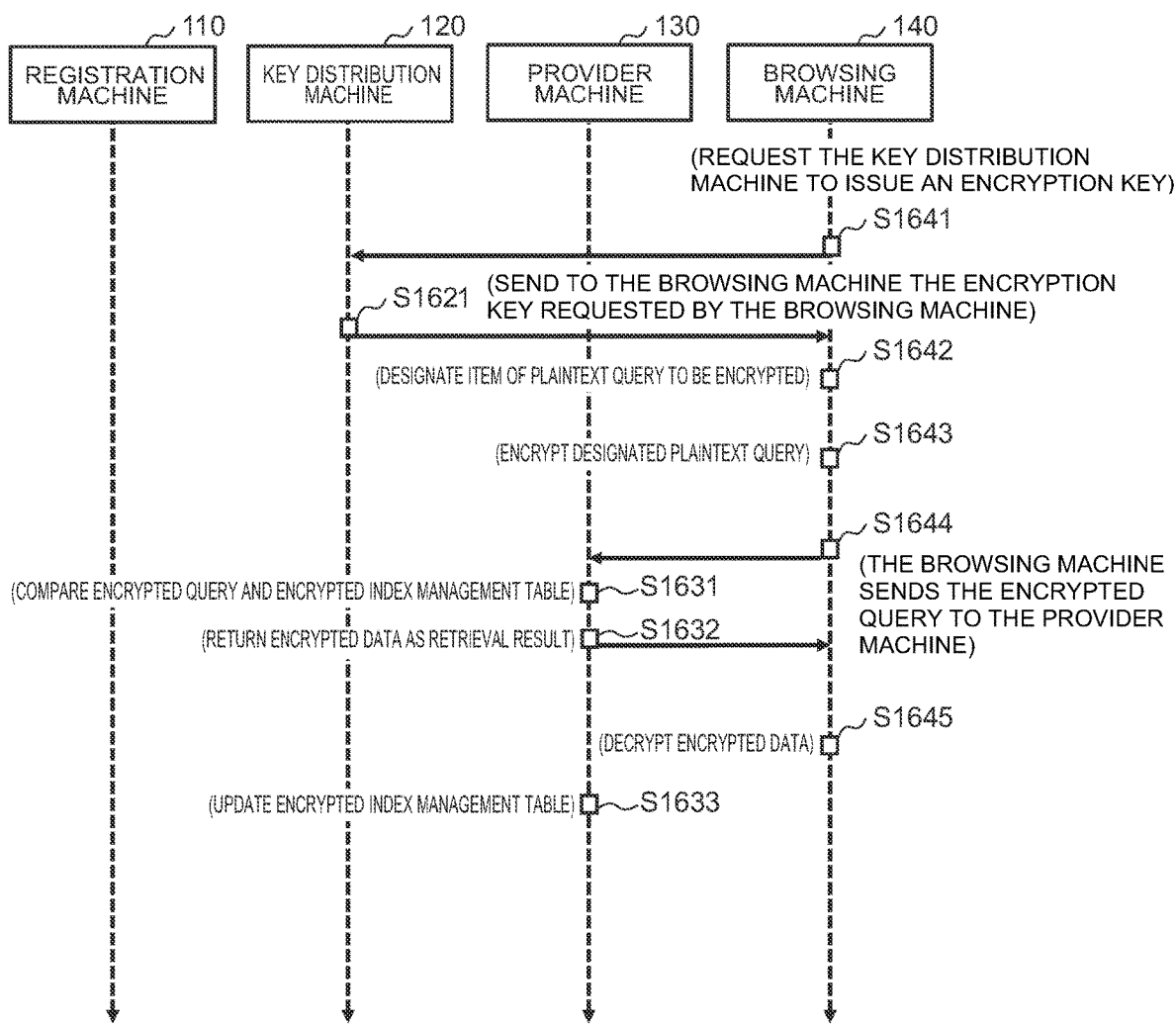

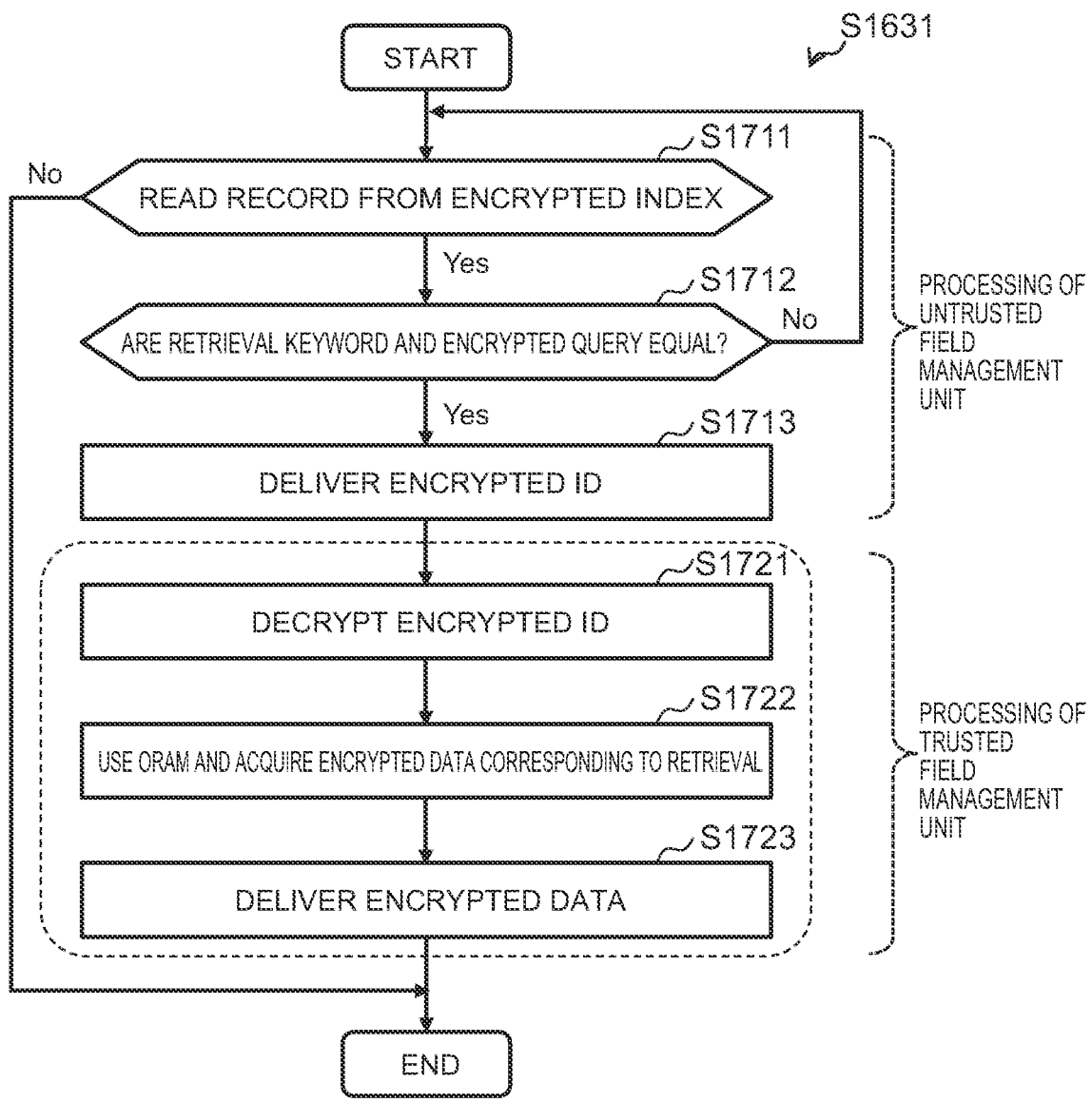

(ENCRYPTED INDEX MANAGEMENT TABLE UPDATE PROCESSING)

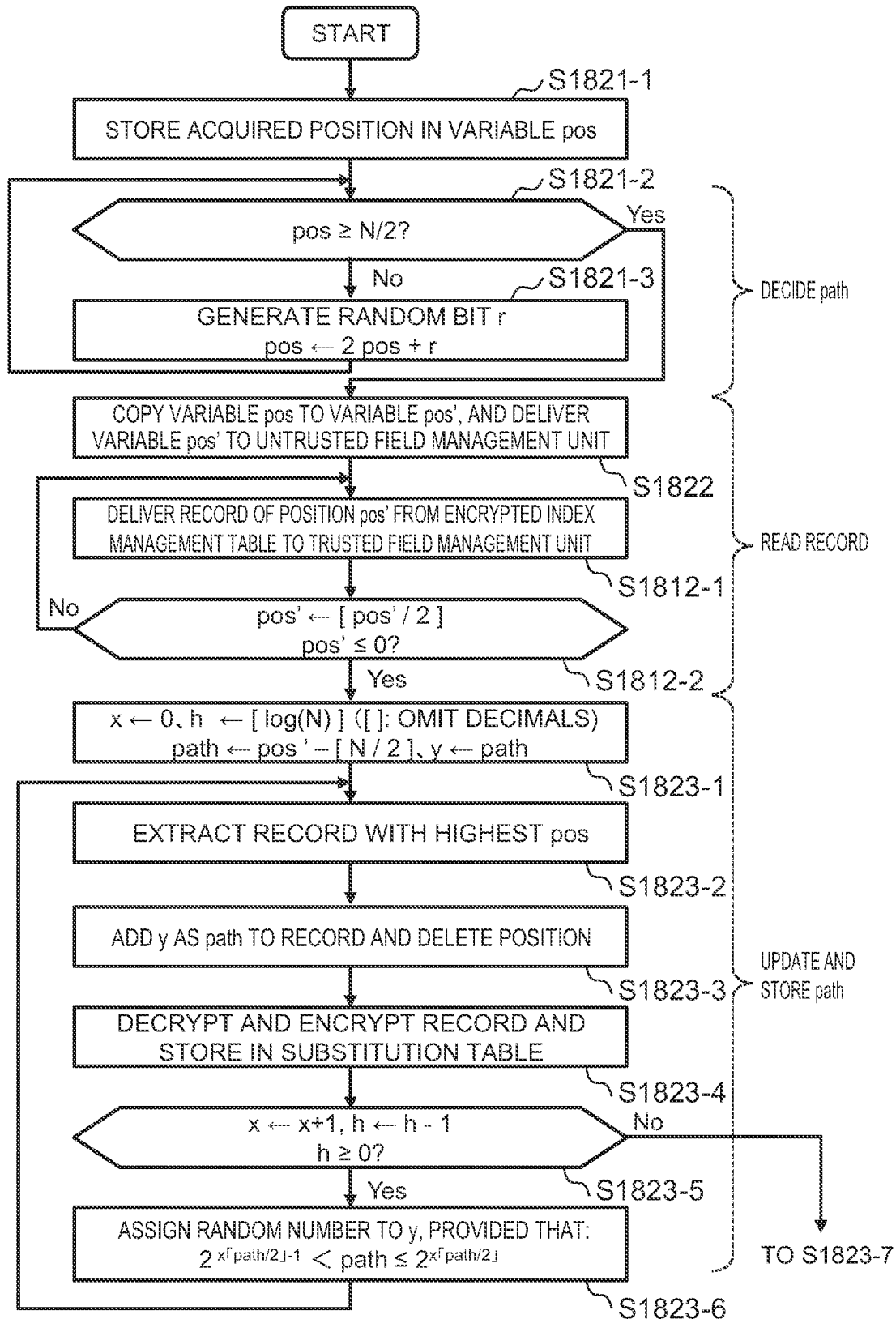

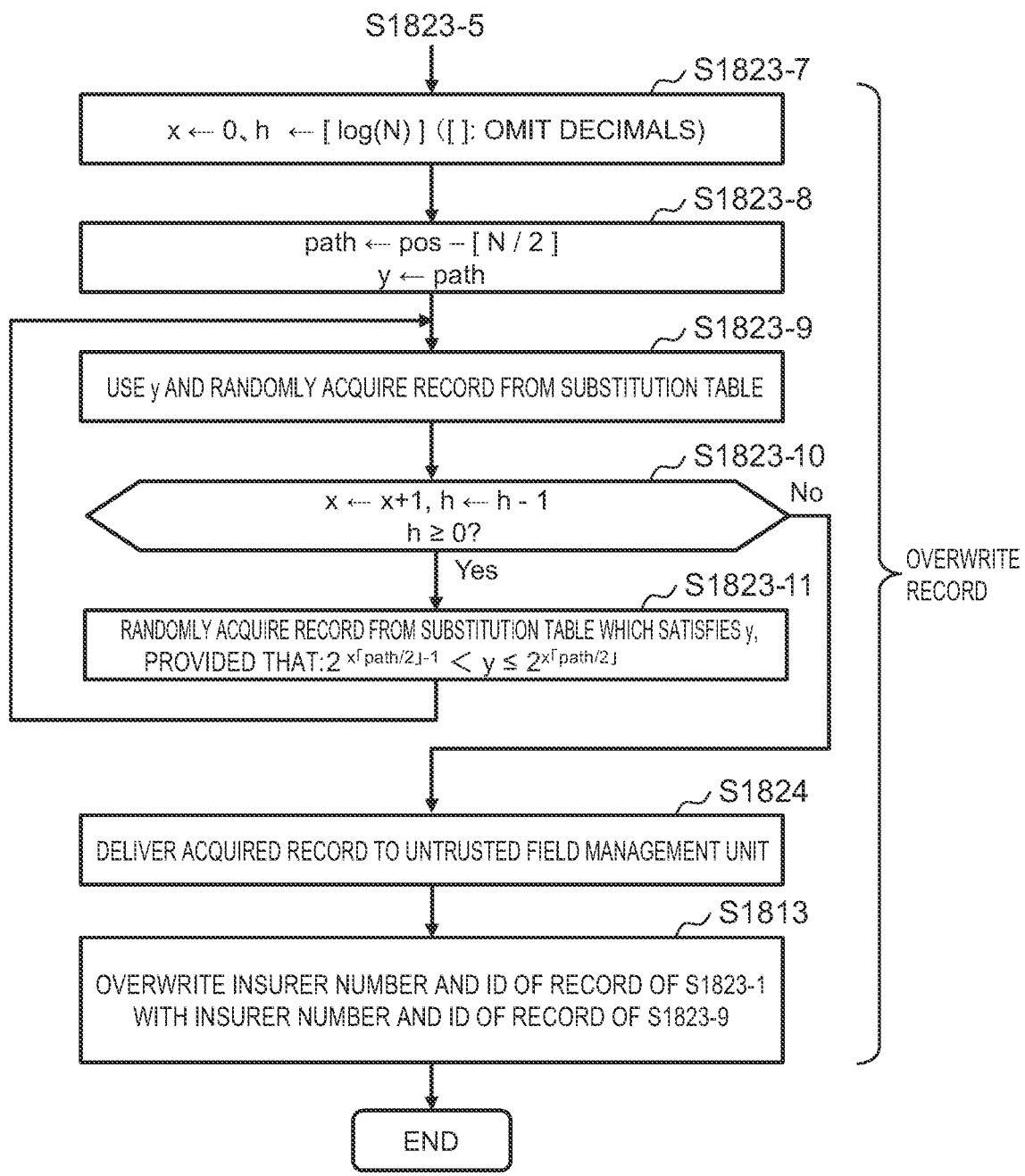

FIG. 19

ENCRYPTED INDEX MANAGEMENT TABLE 1910

| INSURER NUMBER | ID | POSITION |
|---|---|---|
| E(0112345678) | E(1, 3, 8) | 7 |
| E(3323456789) | E(12, 13) | 4 |
| E(0234567890) | E(10) | 3 |
| E(0145678901) | E(2,4) | 2 |
| E(3356789012) | E(25) | 5 |
| E(0378901234) | E(6,7) | 1 |
| ... | ... | 6 |

SUBSTITUTION TABLE 1920

| INSURER NUMBER | ID | path |
|---|---|---|
| E(1267890123) | E(1,2) | 1 |
| E(1378901234) | E(14,15) | 2 |
| | | |
| | | |
| | | |
| | | |

FIG. 20

ENCRYPTED INDEX MANAGEMENT TABLE 2010

| INSURER NUMBER | ID | POSITION |
|---|---|---|
| E(0112345678) | E(1, 3, 8) | 7 |
| E(3323456789) | E(12, 13) | 4 |
| E(0234567890) | E(10) | 3 |
| E(0145678901) | E(2,4) | 2 |
| E(3356789012) | E(25) | 5 |
| E(0378901234) | E(6,7) | 1 |
| ... | ... | 6 |

SUBSTITUTION TABLE 2020

| INSURER NUMBER | ID | path |
|---|---|---|
| E(1267890123) | E(1,2) | 1 |
| E(1378901234) | E(14,15) | 2 |
| E(3323456789) | E(12, 13) | 1 |
| E(0145678901) | E(2,4) | 2 |
| E(0378901234) | E(6,7) | 3 |

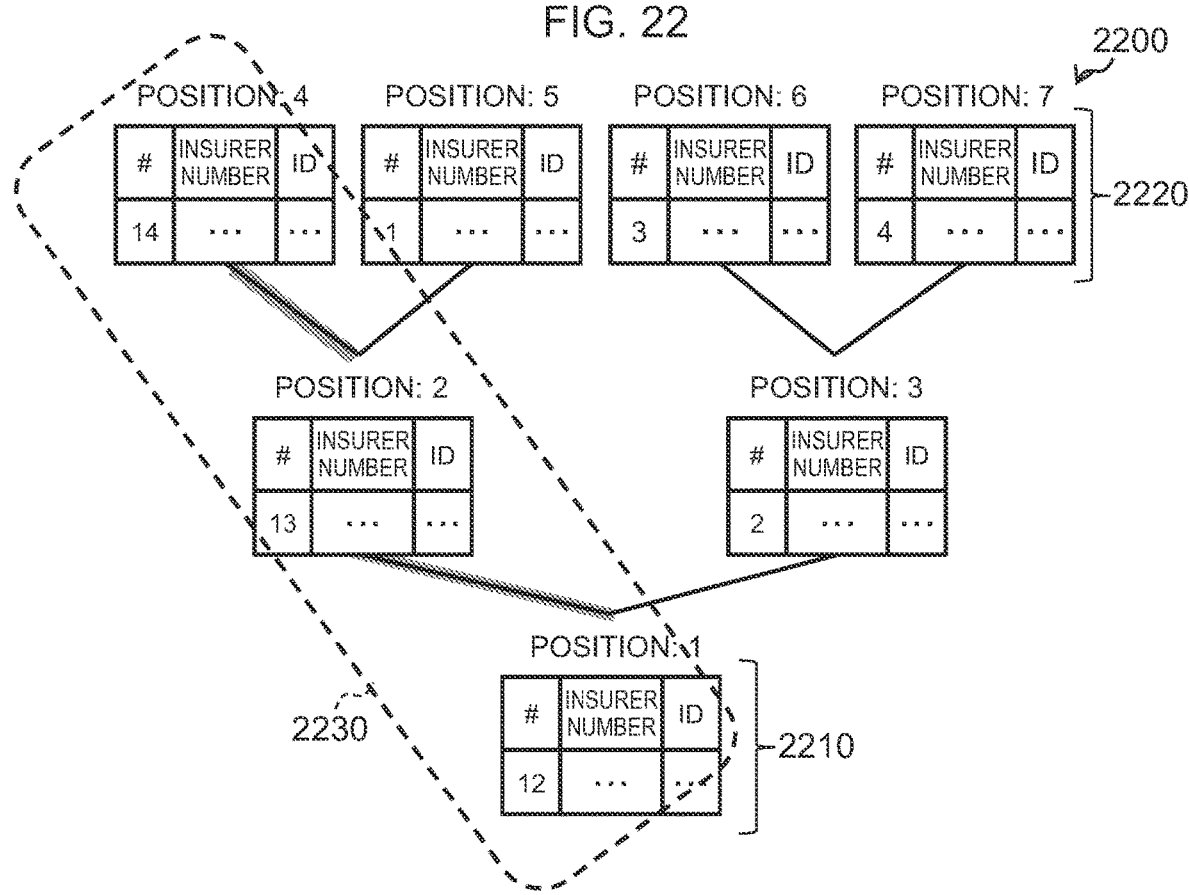

RETRIEVAL SYSTEM, RETRIEVAL DEVICE AND RETRIEVAL METHOD

CROSS-REFERENCE TO PRIOR APPLICATION

This application relates to and claims the benefit of priority from Japanese Patent Application number 2020-77986, filed on Apr. 27, 2020 the entire disclosure of which is incorporated herein by reference.

BACKGROUND

The present invention generally relates to a technology of retrieving encrypted data.

In order to streamline the development of information systems and reduce the management cost required for the operation of information systems, it is now becoming common practice to perform data processing on a cloud server device provided by another organization. When a cloud is used, data of one's own organization will be entrusted to a server device managed by another organization. Thus, utilization of the TEE (Trusted Execution Environment) function installed in computers for preventing the leakage of information is attracting attention. For example, NPTL 1 discloses a means for accessing data, while ensuring the confidentiality of data even from the administrator of the cloud server device, by using the TEE function.

The technology disclosed in NPTL 1 is a method of concealing access to data, and retrieval processing of that data cannot be concealed. With respect to this point, data can be retrieved in an encrypted state by using the technology disclosed in NPTL 2.

[NPTL 1] Oblivious Memory Primitives from Intel SGX, Sajin Sasy, Sergey Gorbunov, Christopher Fletcher. 25th Annual Network and Distributed System Security Symposium (NDSS 2018).

[NPTL 2] Muhammad Naveed, Seny Kamara, Charles V. Wright. Inference Attacks on Property-Preserving Encrypted Databases. ACM Conference on Computer and Communications Security 2015 (ACM CCS 2015).

SUMMARY

Nevertheless, with the technology disclosed in NPTL 2, the retrieval result is not concealed and, consequently, is not safe. For example, when the technology disclosed in NPTL 2 is used, the keyword used for the retrieval can be deciphered from the frequency of the retrieval result.

The present invention was devised in view of the foregoing points, and an object of this invention is to propose a retrieval system, a retrieval device and a retrieval method capable of realizing a highly confidential retrieval.

In order to achieve the foregoing object, the present invention provides a retrieval system comprising a provider machine which performs a retrieval in response to an encrypted query as an encrypted version of a query from a browsing machine for browsing encrypted data as an encrypted version of data, and provides a retrieval result to the browsing machine, the retrieval system comprising: a first management unit which stores, in a first storage area that cannot be browsed by an administrator of the provider machine, management information in which an encrypted retrieval keyword as an encrypted version of a retrieval keyword used for the retrieval performed by the provider machine, and an encrypted ID, which is associated with the encrypted retrieval keyword, as an encrypted version of identifying information capable of identifying the encrypted data, are associated, and, of the management information, decrypts, and then once again encrypts, the encrypted retrieval keyword corresponding to the encrypted query from the browsing machine and the encrypted ID corresponding to the encrypted retrieval keyword; and a second management unit which stores, in a second storage area, index information in which the encrypted retrieval keyword used for the retrieval performed by the provider machine, and one or more encrypted IDs associated with the encrypted retrieval keyword, are associated, and, of the index information, updates the encrypted retrieval keyword and the encrypted ID corresponding to the encrypted query from the browsing machine to the encrypted retrieval keyword and the encrypted ID which were decrypted and then encrypted by the first management unit.

With the foregoing configuration, the encrypted retrieval keyword and the encrypted ID are re-encrypted in an area that cannot be browsed by the administrator, and the index information is updated based on the encrypted retrieval keyword and encrypted ID that were re-encrypted. As a result of updating the index information in the foregoing manner, for example, the deciphering of the frequency of the retrieval result can be made difficult. According to the foregoing configuration, for example, it is possible to avoid a situation where the original data is leaked based on the frequency of retrieval. Moreover, as a result of the retrieval of encrypted data being performed safely, the user of the provider machine can entrust data to the provider machine with a sense of security without having to worry about the leakage of information.

According to the present invention, it is possible to realize a highly reliable retrieval system.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram showing an example of the database according to the first embodiment.

FIG. 4 is a diagram showing an example of the database according to the first embodiment.

FIG. 5 is a diagram showing an example of the result of the retrieval performed according to the first embodiment.

FIG. 6 is a diagram showing an example of the result of decrypting the retrieval result according to the first embodiment.

FIG. 7 is a diagram showing an example of the plaintext index according to the first embodiment.

FIG. 8 is a diagram showing an example of the encrypted index according to the first embodiment.

FIG. 14 is a diagram showing an example of the encrypted index management table according to the first embodiment.

FIG. 15 is a diagram showing an example of the substitution table according to the first embodiment.

FIG. 16 is a diagram showing an example of the sequence diagram according to the first embodiment.

FIG. 17 is a diagram showing an example of the flowchart according to the first embodiment.

FIG. 18B is a diagram showing an example of the flowchart according to the first embodiment.

FIG. 18C is a diagram showing an example of the flowchart according to the first embodiment.

FIG. 19 is a diagram showing an example of the encrypted index management table and the substitution table according to the first embodiment.

FIG. 20 is a diagram showing an example of the encrypted index management table and the substitution table according to the first embodiment.

FIG. 21 is a diagram showing an example of the encrypted index management table and the substitution table according to the first embodiment.

FIG. 22 is a diagram explaining the management method of the encrypted retrieval keyword and the encrypted ID according to the first embodiment.

DETAILED DESCRIPTION OF EMBODIMENTS

(1) First Embodiment

Figure 1:
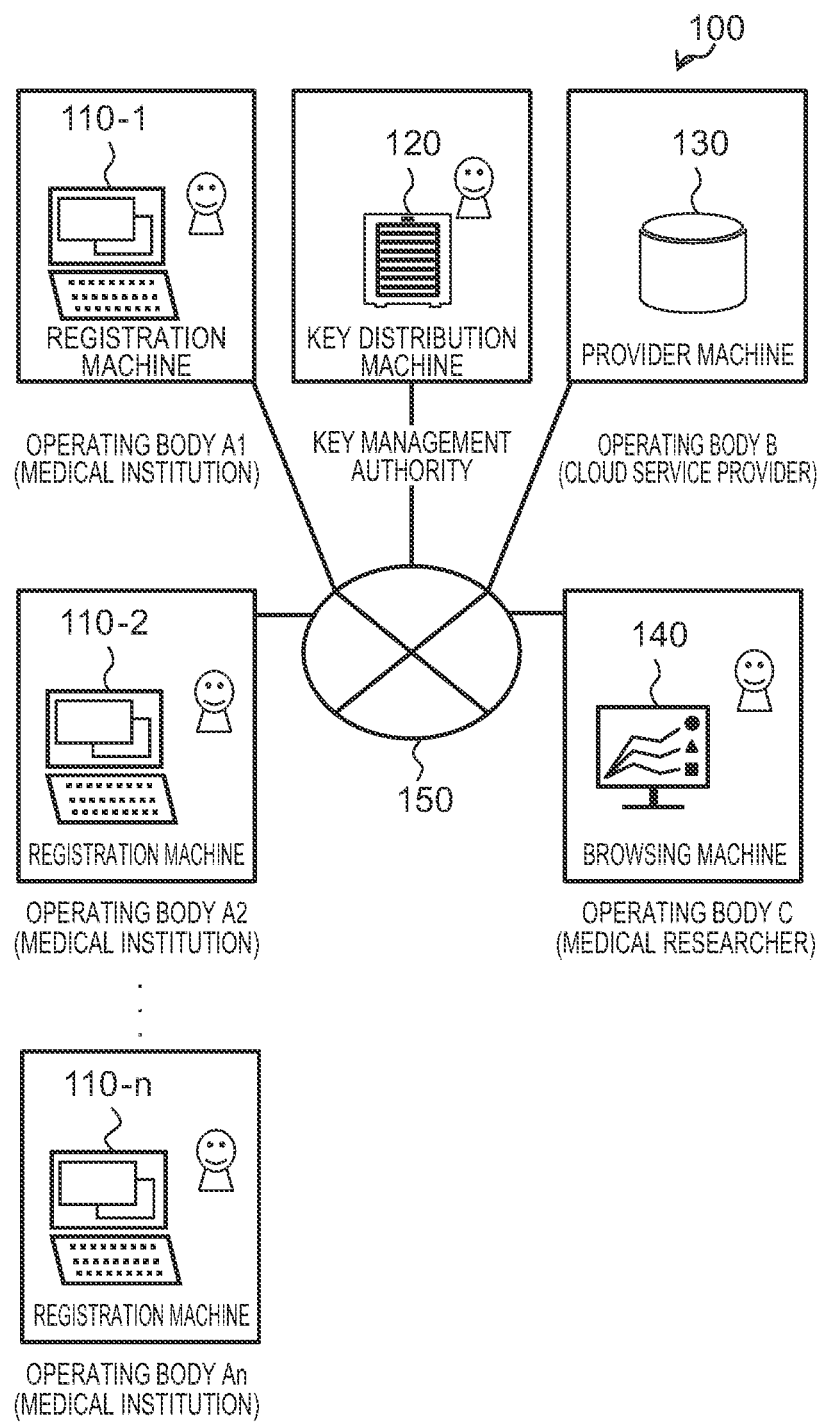
FIG. 1 is a diagram showing an example of the configuration of the retrieval system according to the first embodiment.

An embodiment of the present invention is now explained in detail. In this embodiment, a technology of retrieving encrypted data is explained.

The retrieval system shown in this embodiment is, for example, a retrieval system capable of comparing, while encrypting, a retrieval keyword and a query. With this retrieval system, the retrieval keyword is encrypted. Moreover, with this retrieval system, an ID (identification) which constitutes a set with the retrieval keyword is also encrypted. With this retrieval system, each time a retrieval is performed, the retrieval keyword and the ID are decrypted (decoded), and then re-encrypted, in an area that cannot be browsed by an administrator of the retrieval device.

With this retrieval system, for example, by utilizing the TEE function which provides an area on a cloud that cannot be accessed even by the server administrator, or a browsing machine which requests the browsing of the encrypted data and cannot be accessed even by the server administrator, and concealing the frequency of retrieval while retrieving data in a state of being encrypted, the retrieval can be concealed from the cloud server administrator.

With this retrieval system, the retrieval keyword and the ID are decrypted, and then once again re-encrypted, in an area that cannot be browsed by the administrator of the retrieval device each time a retrieval is performed. According to the foregoing configuration, for example, it is possible to avoid a situation where the original data is leaked based on the frequency of retrieval in the retrieval processing of the encrypted data. Consequently, the user of the retrieval device can entrust data to the retrieval device with a sense of security without having to worry about the leakage of information.

Moreover, for example, with this retrieval system, the retrieval keyword may be shuffled each time a retrieval is performed, and the substitution table to be used for the shuffling may be managed in an area that cannot be browsed by the administrator of the retrieval device.

Moreover, for example, with this retrieval system, the encryption key used for encryption and decryption may be shared by the browsing machine requesting the browsing of the encrypted data and the retrieval device, and the retrieval device may manage the encryption key in an area that cannot be browsed by the administrator of the retrieval device.

Moreover, for example, with this retrieval system, the retrieval keyword and the data may be encrypted and managed, and the retrieval keyword and the data may be shuffled each time a retrieval is performed.

An embodiment of the present invention is now explained with reference to the appended drawings. However, the present invention is not limited to the following embodiment. Moreover, in this embodiment, as a general rule, the same reference numeral is assigned to the same element, and any redundant explanation will be omitted.

Note that, in the following explanation, when the same types of elements are explained without being differentiated, the common part (part excluding the branch number) of the reference code including the branch number will be used, and when the same types of elements are explained by being differentiated, the reference code including the branch number may be used. For example, when the registration machines are explained without any particular differentiation, they will be indicated as "registration machine 110", and when the individual registration machines are explained by being differentiated, they may be indicated as "registration machine 110-1", "registration machine 110-2" and so on.

In FIG. 1, reference numeral 100 represents the retrieval system according to the first embodiment. The key terms used in this embodiment are foremost explained.

(A) Registration Machine 110

The registration machine 110 means any one or all of a registration machine 110-1, a registration machine 110-2, . . . , and a registration machine 110-n.

(B) Encryption Key

There are an encryption key for use in the block encryption explained in (I) below, and an encryption key for use in the retrievable encryption explained in (J) below. The encryption key may sometimes be indicated as "sk (secret key)". The encryption key for use in the block encryption and the encryption key for use in the retrievable encryption may be the same, or may be different.

(C) Data

Data to be encrypted is indicated as "plaintext data" or simply as "data". Once the data is encrypted, such data is thereafter indicated as "encrypted data".

(D) Query

The target to be compared with an index is indicated as "query". The query of the plaintext that has not been encrypted is indicated as "plaintext query" or simply as "query". Once the query is encrypted, such query is thereafter indicated as "encrypted query".

(E) Index

An index is a sequence configured from a set of a retrieval keyword and an ID. During a retrieval, the retrieval keyword and the query are compared, and the ID, which is a set of the query and the matching retrieval keyword, is the retrieval result. The index to be encrypted is indicated as "plaintext index" or simply as "index". The encrypted plaintext index is indicated as "encrypted index". An encrypted index is a sequence configured from a set of the encrypted retrieval keyword and the encrypted ID.

(F) Index Management Table

In an index management table, a position has been added to the index, which is a sequence table configured from a set of the retrieval keyword and the ID. The plaintext index to which this position has been added is indicated as "plaintext index management table". Moreover, when a position is added to the encrypted index, this is indicated as "encrypted index management table".

(G) Record

In a database or an index which manages data in a table format configured from lines and columns, the aggregate of plaintext data belonging to the same line is indicated as "record". Similarly, the aggregate of encrypted data belonging to the same line is indicated as "encrypted record".

(H) Cell

In a database which manages data in a table format configured from lines and columns, a square designated with a line number and a column number is indicated as "cell". In this embodiment, for the sake of simplification, let it be assumed that one data is stored in one cell.

(I) Block Encryption

The retrieval system 100 comprises a data encryption function and a data decryption function. The data encryption function inputs plaintext data and an encryption key, and outputs encrypted data. The data decryption function inputs encrypted data and an encryption key, and outputs plaintext data.

(J) Retrievable Encryption

The retrieval system 100 comprises a function of being able to compare data in an encrypted state without having to decrypt the data. Moreover, the retrieval system 100 comprises an index encryption function, a query encryption function, and a comparison function. The index encryption function inputs a plaintext index and an encryption key, and outputs an encrypted index. The query encryption function inputs a plaintext query and an encryption key, and outputs an encrypted query. The comparison function is a function of inputting an encrypted retrieval keyword and an encrypted query in the encrypted index, and determining whether the retrieval keyword before being encrypted and the value of the plaintext query are equal. Excluding probabilities that can be ignored, the comparison function outputs "1" when the respective values are equal, and outputs "0" when the respective values are different.

(K) E (x)

E (x) represents the encrypted data as an encrypted version of the plaintext data x.

(L) Log (x)

Log (x) is a log function in which a variable x is an antilogarithm, and a base is "2". For example, log (2)=1, log (4)=2, log (8)=3.

(M) [x]

[x] is a rounding function of rounding off the first decimal place of a real number x. For example, [4.3]=4.

(N) 'x'

'x' is a rounding function of rounding up the first decimal place of a real number x. For example, '4.3'=5.

(O) Power (x, y)

Power (x, y) is a power function for calculating the power of y of a variable x. For example, power (2, 3)=$2^3$=8.

The foregoing explanation described a case where the block encryption and the retrievable encryption are a common key encryption method. Nevertheless, this embodiment is not limited to a common key encryption method, and a public key encryption method may also be used. In the foregoing case, the encryption key to be input to a part of the functions explained above is replaced with a public key.

In the foregoing explanation, while "0" or "1" was used as the output value in the comparison function of the retrievable encryption, retrievable encryption using other output values may also be used. For example, retrievable encryption which outputs "1" (large), "0" (equal), "−1" (small) as the size comparison result between the retrieval keyword and the plaintext query may also be used. Moreover, retrievable encryption which outputs "0" or "1" depending on whether the retrieval keyword and the plaintext query satisfy a specific relationship may also be used.

FIG. 1 is a diagram showing an example of the configuration of the retrieval system 100. As shown in FIG. 1, the retrieval system 100 is implemented with a key management authority, operating bodies A (1 to n), an operating body B, and an operating body C. The retrieval system 100 comprises a key distribution machine 120 owned by the key management authority, registration machines 110-1 to 110-n owned by the operating bodies A (1 to n), a provider machine 130 owned by the operating body B, and a browsing machine 140 owned by the operating body C. The registration machines 110-1 to 110-n, the key distribution machine 120, the provider machine 130 and the browsing machine 140 are respectively connected communicably via a network 150.

In the following explanation, a case of applying the retrieval system 100 to a medical examination business is described. In the following explanation, let it be assumed that the operating bodies A (1 to n) are "medical institutions", the operating body B is a "cloud service provider", and the operating body C is a "medical researcher".

The medical researcher is operating its own information system by entrusting it to the provider machine 130 of the cloud service provider. Accordingly, the medical research entrusts, to the provider machine 130, the medical data acquired from a medical institution and the index for retrieving such medical data. Medical data is the personal information of the medical institution, and must be handled with care together with the index, so that they are not leaked to others.

Thus, the medical institution encrypts the items designated in the medical data input to the registration machine 110-1 using the encryption key issued by the key distribution machine 120 of the key management authority, and entrusts the encrypted items to the provider machine 130 of the cloud service provider. Similarly, the retrieval keyword in the plaintext index is encrypted using the encryption key, and the encrypted retrieval keyword is entrusted to the provider machine 130 of the cloud service provider.

Accordingly, the contents of the encrypted items in the individual medical data are not disclosed to the cloud service provider by being included in the database or the index.

The provider machine 130 of the cloud service provider manages the medical data in an encrypted state. The medical researcher requests the cloud service provider to send the encrypted query from the browsing machine 140 to the provider machine 130, and then have the provider machine 130 perform retrieval processing using the encrypted query, and output the medical data corresponding to the retrieval result. The provider machine 130 compares the encrypted retrieval keyword included in the encrypted index and the encrypted query, and outputs the encrypted data from the encrypted database based on the comparative result.

Figure 2:
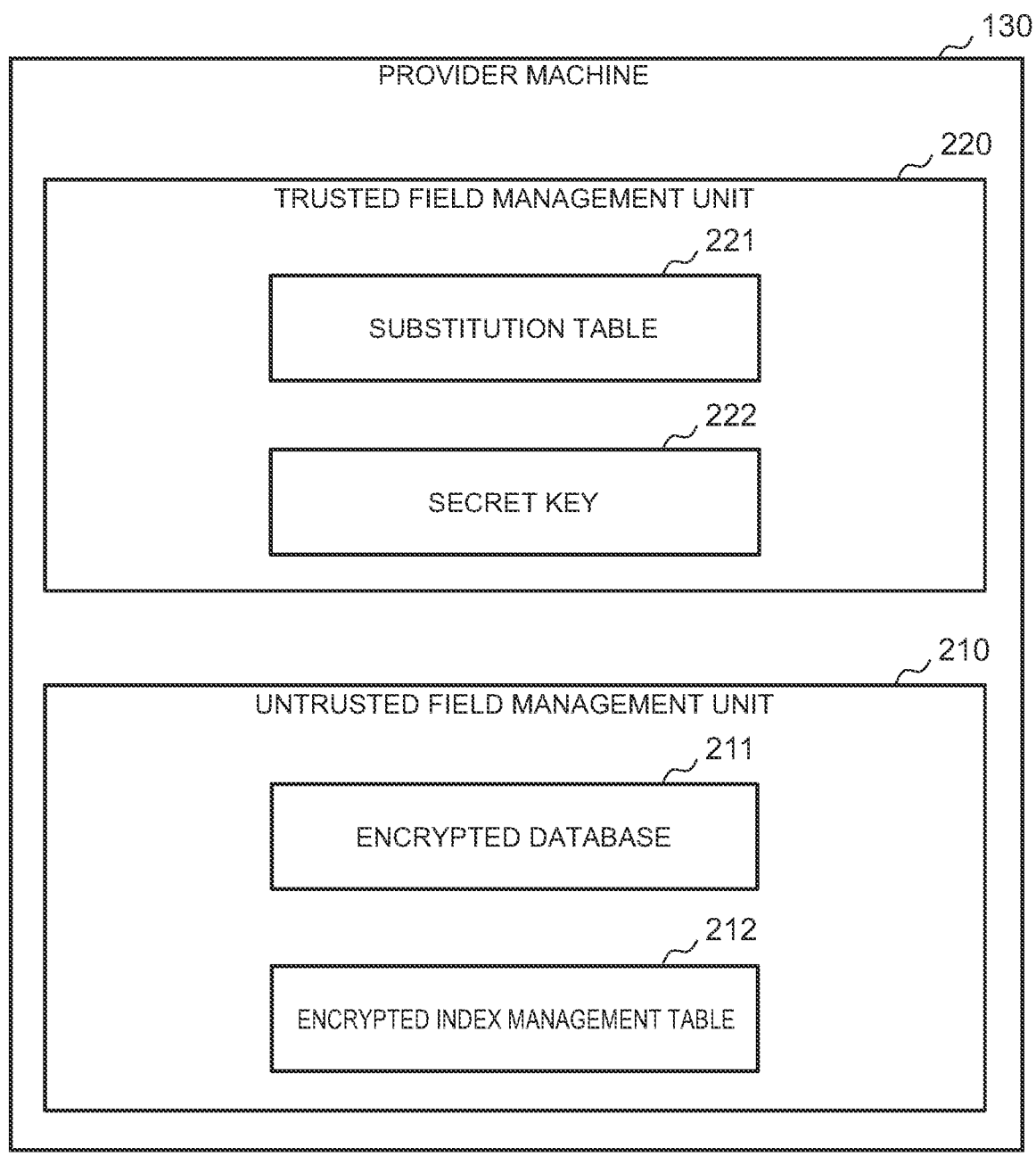
FIG. 2 is a diagram showing an example of the configuration of the provider machine according to the first embodiment.

FIG. 2 is a diagram showing an example of the configuration of the provider machine 130. The provider machine 130 is an example of a retrieval device which performs a retrieval. The provider machine 130 comprises a untrusted field management unit 210 which manages a untrusted field (storage area) that is not subject to special access control, and a trusted field management unit 220 which manages a trusted field (storage area) that is subject to access control so that data cannot be browsed even by the administrator of the provider machine 130.

The untrusted field, for example, is provided in an external storage device or in a memory, and retains an encrypted database 211 storing the encrypted data and an encrypted index management table 212. The trusted field, for example, is provided in a memory, and retains a substitution table 221 and an encryption key 222. The encryption key 222 is an encryption key that is distributed by the key distribution machine 120 (key management authority).

FIG. 3 is a diagram showing an example of the database managed by the registration machine 110. An example of this database is indicated as a plaintext database 300. The plaintext database 300 stores a list of the medical data registered by the registration machine 110. The key distribution machine 120 of the key management authority issues an encryption key 222 for each designated item, and the registration machine 110 of the medical institution encrypts, for each item, the medical data using the issued encryption key 222. In the following explanation, for the sake of simplification, let it be assumed that one item corresponds to one column.

FIG. 4 is a diagram showing an example of the database (encrypted database 211) managed by the provider machine 130. The encrypted database 211 stores a list of the medical data stored in the provider machine 130. An example of this encrypted database 211 is indicated as an encrypted database 400. The encrypted database 400 stores data of the encrypted plaintext database 300.

FIG. 5 is a diagram showing an example of the result of the provider machine 130 retrieving data from the encrypted database 211. An example of this retrieval result of the encrypted database 400 is indicated as an encrypted database retrieval result 500. The encrypted database retrieval result 500 stores the encrypted medical data extracted by the provider machine 130 from the encrypted database 400. In this example, explained is a case where, as the retrieval result, an encrypted record having an ID of "2" and an encrypted record having an ID of "4" have been output.

FIG. 6 is a diagram showing an example of the result of the browsing machine 140 decrypting the retrieval result. An example of this result of decrypting the encrypted database retrieval result 500 is indicated as a retrieval result 600.

FIG. 7 is a diagram showing an example of the plaintext index managed by the registration machine 110. An example of this plaintext index is indicated as a plaintext index 700.

FIG. 8 is a diagram showing an example of the encrypted index managed by the provider machine 130. An example of this encrypted index in which the plaintext index 700 has been encrypted is indicated as an encrypted index 800. The key distribution machine 120 of the key management authority issues an encryption key 222 for each designated column, and the registration machine 110 of the medical institution uses the issued encryption key 222 and encrypts the plaintext index 700 of the medical data for each column. As with the database, in the following explanation, for the sake of simplification, let it be assumed that one item corresponds to one column.

Figure 9:
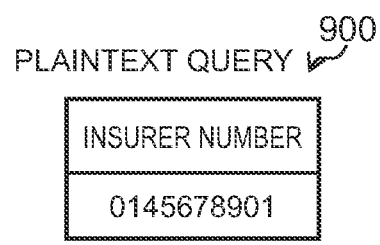
FIG. 9 is a diagram showing an example of the plaintext query according to the first embodiment.

FIG. 9 is a diagram showing an example of the plaintext query. An example of this plaintext query is indicated as a plaintext query 900. The plaintext query 900 shows the plaintext query when the browsing machine 140 has selected insurer number "0145678901" as the retrieval item.

Figure 10:
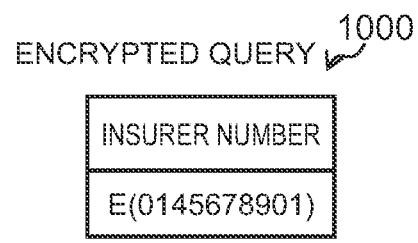
FIG. 10 is a diagram showing an example of the encrypted query according to the first embodiment.

FIG. 10 is a diagram showing an example of the encrypted query. An example of this encrypted query in which the plaintext query 900 has been encrypted is indicated as an encrypted query 1000. The encrypted query 1000 shows the encrypted query "E (0145678901)" created by the browsing machine 140.

Figure 11:
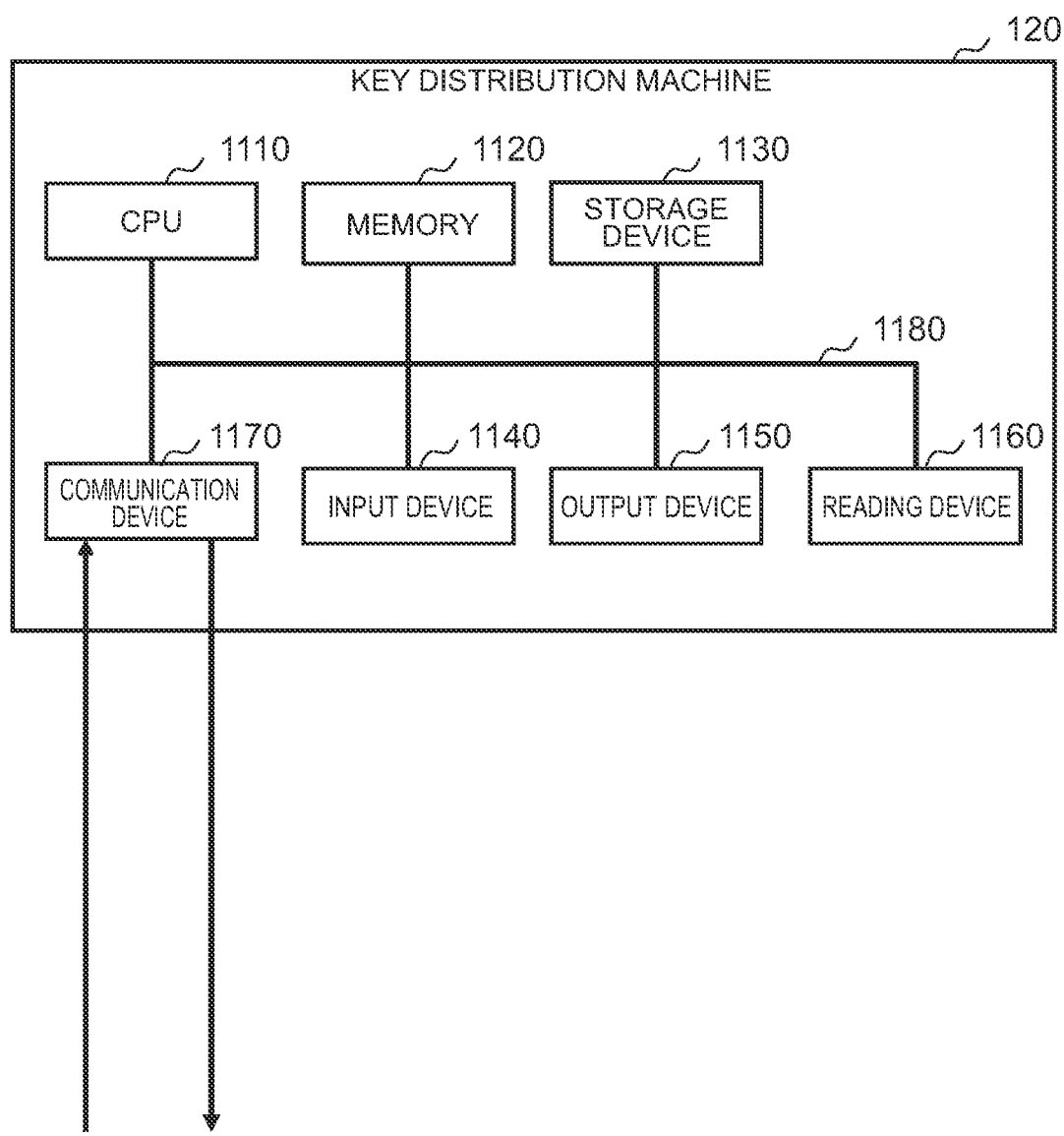
FIG. 11 is a diagram showing an example of the hardware configuration according to the first embodiment.

FIG. 11 is a diagram showing an example of the hardware configuration of the key distribution machine 120. The key distribution machine 120 comprises, as its main constituent elements, a CPU 1110, a memory 1120, a storage device 1130, an input device 1140, an output device 1150, a reading device 1160, and a communication device 1170. The respective constituent elements are connected via an internal signal line 1180.

The registration machine 110, the browsing machine 140, and the provider machine 130 comprise similar hardware. The respective details are omitted since they will be redundant explanations. However, the CPU 1110 of the provider machine 130 is equipped with the TEE function, and a trusted field is provided in the memory 1120 based on the TEE function.

The functions (untrusted field management unit 210, trusted field management unit 220, etc.) of the provider machine 130 may be realized, for example, by the CPU 1110 reading the programs stored in the storage device 1130 into the memory 1120 and executing such programs (software), or realized with hardware such as a dedicated circuit or the like, or realized based on a combination of software and hardware. Moreover, a part of the functions of the provider machine 130 may be realized with another computer capable of communicating with the provider machine 130.

The data registration processing and the data acquisition processing to be performed by the retrieval system 100 are now explained. The data registration processing is foremost explained.

Figure 12:
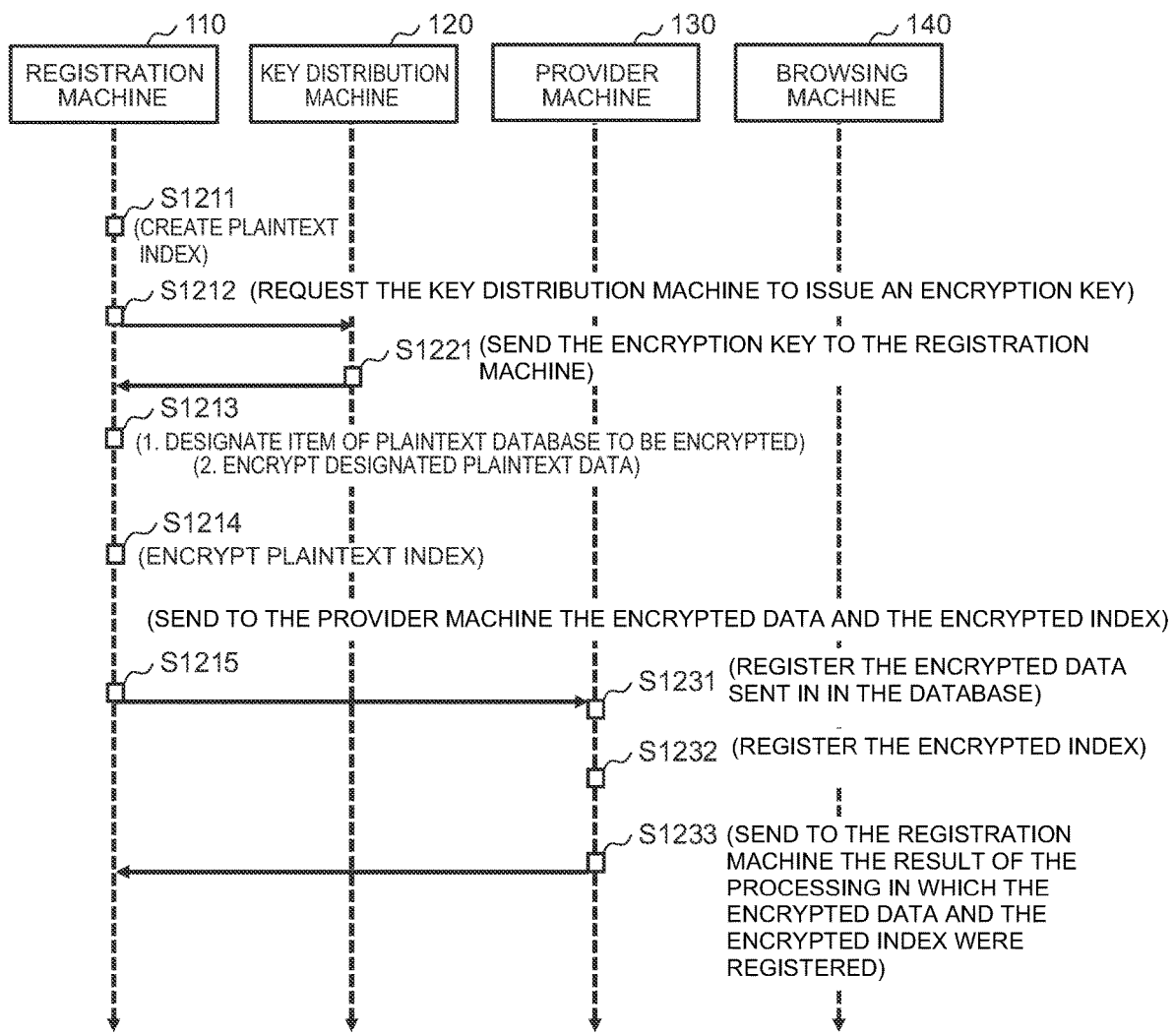
FIG. 12 is a diagram showing an example of the sequence diagram according to the first embodiment.

FIG. 12 is a diagram showing an example of the sequence diagram of the data registration processing. The respective steps of the sequence diagram are now explained.

In S1211, the registration machine 110 selects a retrieval item from the plaintext database, and creates a plaintext index to which is assigned a number capable of identifying a record of the plaintext database from the retrieval item. For example, in the plaintext index 700, an insurer number is stored as the retrieval item in the first column, and an ID of a record is stored as the number for identifying the record in the second column based on the plaintext database 300.

In S1212, the registration machine 110 requests the key distribution machine 120 to issue an encryption key 222.

In S1221, the key distribution machine 120 sends the encryption key 222 to the registration machine 110.

In S1213, the registration machine 110 designates the column of the plaintext database to be encrypted, and encrypts the data of the designated column. The registration machine 110 inputs the plaintext data in each cell in the designated column and the encryption key 222 sent in S1221, and generates encrypted data based on the data encryption function of the block encryption.

In S1214, the registration machine 110 inputs the plaintext index to be encrypted and the encryption key 222 sent in S1221, and generates an encrypted index based on the index encryption function of the retrievable encryption.

In S1215, the registration machine 110 sends, to the provider machine 130, the encrypted data generated in S1213 and the encrypted index generated in S1214.

In S1231, the provider machine 130 registers the encrypted data sent in S1215 in the database. The encrypted database 400 is an example of the database storing the encrypted data. Note that the provider machine 130 may also store dummy encrypted data in the database.

In S1232, the provider machine 130 registers the encrypted index sent in S1215. The encrypted index 800 is an example of the encrypted index.

In S1233, the provider machine 130 sends, to the registration machine 110, the result of the processing in which the encrypted data and the encrypted index were registered in S1231 and S1232.

Note that the foregoing processing routine is merely an example, and the processing order and/or the processing content may be changed as needed. For example, when the registration machine 110 and the key distribution machine 120 belong to the same subject, a part of the processing may be omitted.

Figure 13:
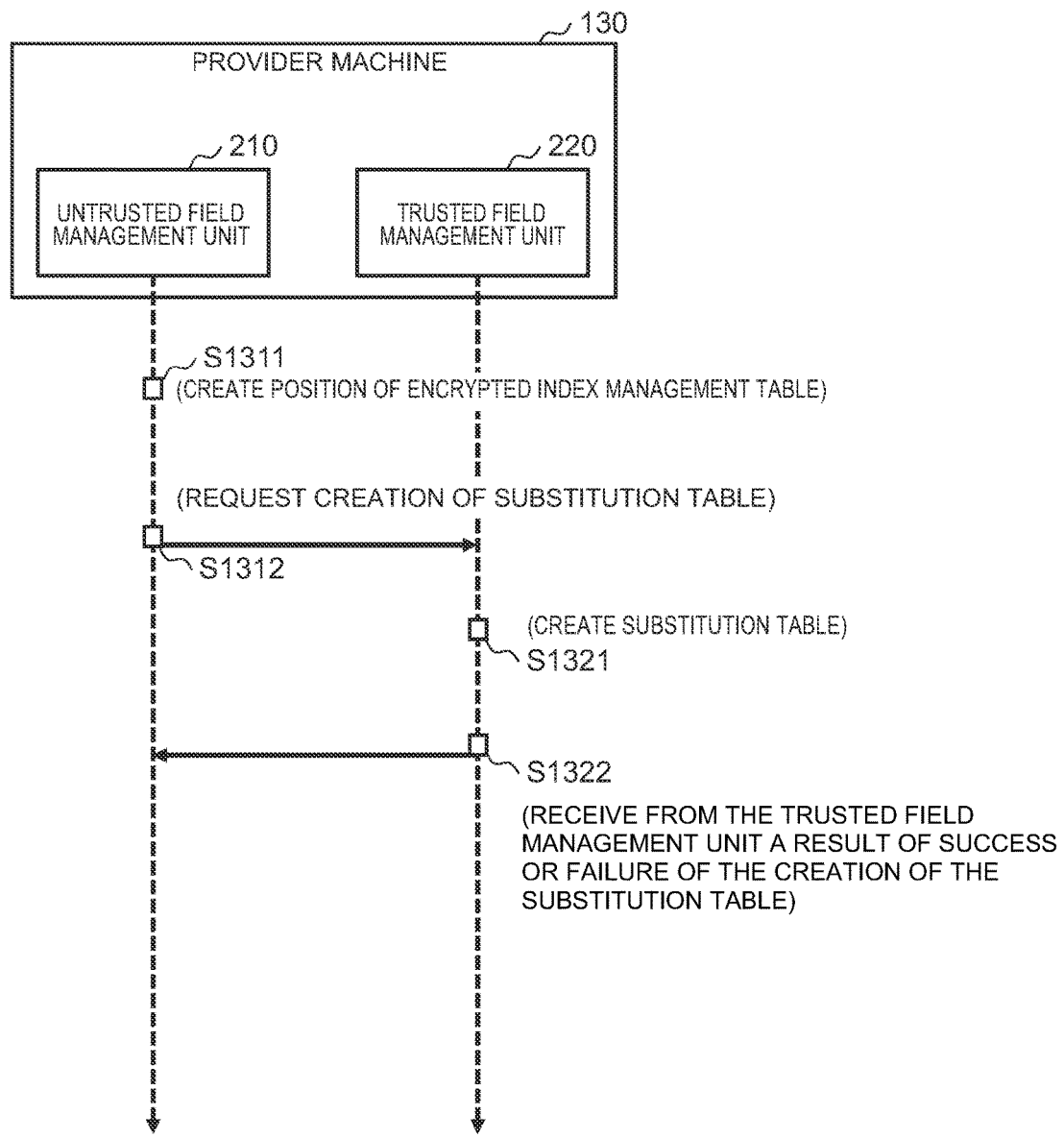
FIG. 13 is a diagram showing an example of the details of the processing according to the first embodiment.

The registration processing of the encrypted index of S1232 is, as shown in FIG. 13, divided into a processing flow of the untrusted field management unit 210 and a processing flow of the trusted field management unit 220 in the provider machine 130.

FIG. 13 is a diagram showing an example of the details of the processing of S1232.

In S1311, the untrusted field management unit 210 of the provider machine 130 creates a position of the encrypted index in each record. The value of the position of each record may be set freely so as long as the values do not overlap. The untrusted field management unit 210 adds the created position to the encrypted index and creates the encrypted index management table 212.

FIG. 14 is a diagram showing an example of the encrypted index management table 212. In the following explanation, an example of the encrypted index management table 212 which manages seven records is indicated as an encrypted index management table 1400.

In S1312, the untrusted field management unit 210 requests the trusted field management unit 220 to create a substitution table 221.

In S1321, the trusted field management unit 220 creates the substitution table 221.

FIG. 15 is a diagram showing an example of the substitution table 221. In the following explanation, the substitution table 221 showing an initial state is indicated as a substitution table 1500. Note that the substitution table 1500 may have dummy data corresponding to the dummy encrypted data registered therein.

In S1322, the untrusted field management unit 210 receives, from the trusted field management unit 220, a result of success or failure of the creation of the substitution table 221.

The data acquisition processing is now explained.

FIG. 16 is a diagram showing an example of the sequence diagram of the data acquisition processing. The respective steps of the sequence diagram are now explained.

In S1641, the browsing machine 140 requests the key distribution machine 120 to issue an encryption key 222.

In S1621, the key distribution machine 120 sends, to the browsing machine 140, the encryption key 222 requested by the browsing machine 140.

In S1642, the browsing machine 140 designates an item to be encrypted. The plaintext query 900 shows an example in which the insurer number has been designated.

In S1643, the browsing machine 140 creates a plaintext query for retrieving the item designated in S1642, inputs the created plaintext query and the encryption key 222 sent in S1621, and generates an encrypted query based on the query encryption function of the retrievable encryption.

In S1644, the browsing machine 140 sends the encrypted query created in S1643 to the provider machine 130.

In S1631, the provider machine 130 performs processing of comparing the retrieval keyword in the encrypted query in the item designated in the encrypted query, and the encrypted index management table 212. Here, the encrypted index management table 1400 shown in FIG. 14 is taken as an example. The provider machine 130 extracts a column corresponding to the insurer number from the encrypted index management table 1400, compares the extracted column and the retrieval keyword in the encrypted query, and extracts the ID of the corresponding line when the comparative result is equal. In the example of the encrypted index management table 1400, since the insurer number "0145678901" of the fourth line is equal to the retrieval keyword, the provider machine 130 extracts the ID "E (2, 4)" to become the set.

In S1632, the provider machine 130 decrypts the encrypted ID, extracts the corresponding encrypted data from the encrypted database 211, and sends the extracted encrypted data to the browsing machine 140. For example, the encrypted database retrieval result 500 is an encrypted record in which the IDs extracted from the encrypted database 400 are "2" and "4".

Note that the processing related to the retrieval of encrypted data in S1631 and S1632 (this is hereinafter referred to as the "retrieval processing") will be explained in detail later with reference to FIG. 17.

In S1645, the browsing machine 140 uses the encryption key 222 sent by the key distribution machine 120 in S1221, and decrypts the sent encrypted record. For example, the retrieval result 600 is the result of decrypting the encrypted database retrieval result 500 (encrypted record).

In S1633, the provider machine 130 updates the encrypted index (encrypted index management table 212) that was retrieved. Here, the provider machine 130 may update the position stored in the encrypted database or update the encrypted data which was decrypted and then encrypted with regard to the encrypted data that was retrieved. Note that the processing for updating the encrypted index will be explained in detail later with reference to FIG. 18 to FIG. 21.

FIG. 17 is a diagram showing an example of the flowchart of the retrieval processing.

In S1711, the untrusted field management unit 210 of the provider machine 130 reads one unread record from the encrypted index management table 212. When all records have been read, the untrusted field management unit 210 of the provider machine 130 ends the retrieval processing.

In S1712, the untrusted field management unit 210 compares the retrieval keyword extracted from the record and the encrypted query using the comparison function of the retrievable encryption. The untrusted field management unit 210 proceeds to the processing of S1713 upon determining that the retrieval keyword and the encrypted query are equal, and returns to S1711 upon determining that the retrieval keyword and the encrypted query are different.

In S1713, the untrusted field management unit 210 delivers the encrypted ID to the trusted field management unit 220.

In S1721, the trusted field management unit 220 inputs the encrypted ID and the encryption key 222, and obtains the ID by using the decryption function of the block encryption.

In S1722, the trusted field management unit 220 acquires the encrypted data using the ORAM (Oblivious RAM) technology. The ORAM technology is the technology of changing the storage position of the encrypted data and managing the data each time arithmetic operation is performed to the encrypted data.

For example, in the trusted field management unit 220, the encrypted retrieval keyword and the encrypted ID (this is sometimes hereinafter referred to as the "management data") is managed using a tree structure as shown in FIG. 22. There is no particular limitation regarding the tree in the tree structure, and the tree may be a binary partition tree or a multi-branch tree. In the following explanation, for the sake of simplification, a binary partition tree 2200 is taken as an example.

In the binary partition tree 2200, when a root node 2210 is the $0^{th}$ depth, a leaf node 2220 is the L-th depth, and a number of buckets as the respective nodes is a bucket number M, L is expressed as 'log (M)'−1. Since the bucket number M of the binary partition tree 2200 is "7", the depth L of the leaf node 2220 will be "2" (=L+1='log (M)'). Moreover, since the number of leaf nodes 2220 is expressed as $2^L$, this will be "4" (=$2^2$). Moreover, Z-number ("1" in this example) of management data is stored in the bucket. Note that, when the number of management data stored in the bucket is less than Z-number of management data, the size Z of the bucket is maintained by storing dummy data.

Moreover, in the binary partition tree 2200, when the x ($x \in \{1, \ldots, 2^L\}$)-th leaf node 2220 from the left is "leaf node x" and the path from the leaf node x to the root node 2210 is "path P (x)", for example, the path 2230 is expressed as the path P (1). Note that the management data exists in one or more paths.

For example, when the trusted field management unit 220 receives a position "4" from the untrusted field management unit 210, the trusted field management unit 220 identifies the path 2230 (or the path P (2)) which includes the position "4". Next, the trusted field management unit 220 acquires the management data (set of the insurer number and the ID) included in other buckets (bucket of position "2" and bucket of position "1") configuring the path 2230. Next, the trusted field management unit 220 decrypts the ID of the acquired management data. Next, the trusted field management unit 220 extracts the encrypted data corresponding to each ID from the encrypted database 211 regarding all IDs that were decrypted.

Note that the method of realizing the ORAM by using the trusted field management unit 220 is described, for example, in NPTL 1.

In S1723, the trusted field management unit 220 delivers the encrypted data to the untrusted field management unit 210 of the provider machine 130. Note that the untrusted field management unit 210 uses the comparison function of the retrievable encryption and retrieves the encrypted data of the encrypted retrieval keyword corresponding to the encrypted query from the encrypted data received from the trusted field management unit 220, and sends the retrieval result to the browsing machine 140.

Note that the foregoing processing routine is merely an example, and the processing order and/or the processing content may be changed as needed. For example, when the browsing machine 140 and the key distribution machine 120 belong to the same subject, a part of the processing may be omitted.

The processing of updating the encrypted index management table 212 of S1633 (this processing is hereinafter referred to as the "update processing") is now explained with reference to FIG. 18 to FIG. 21.

Figure 18A:
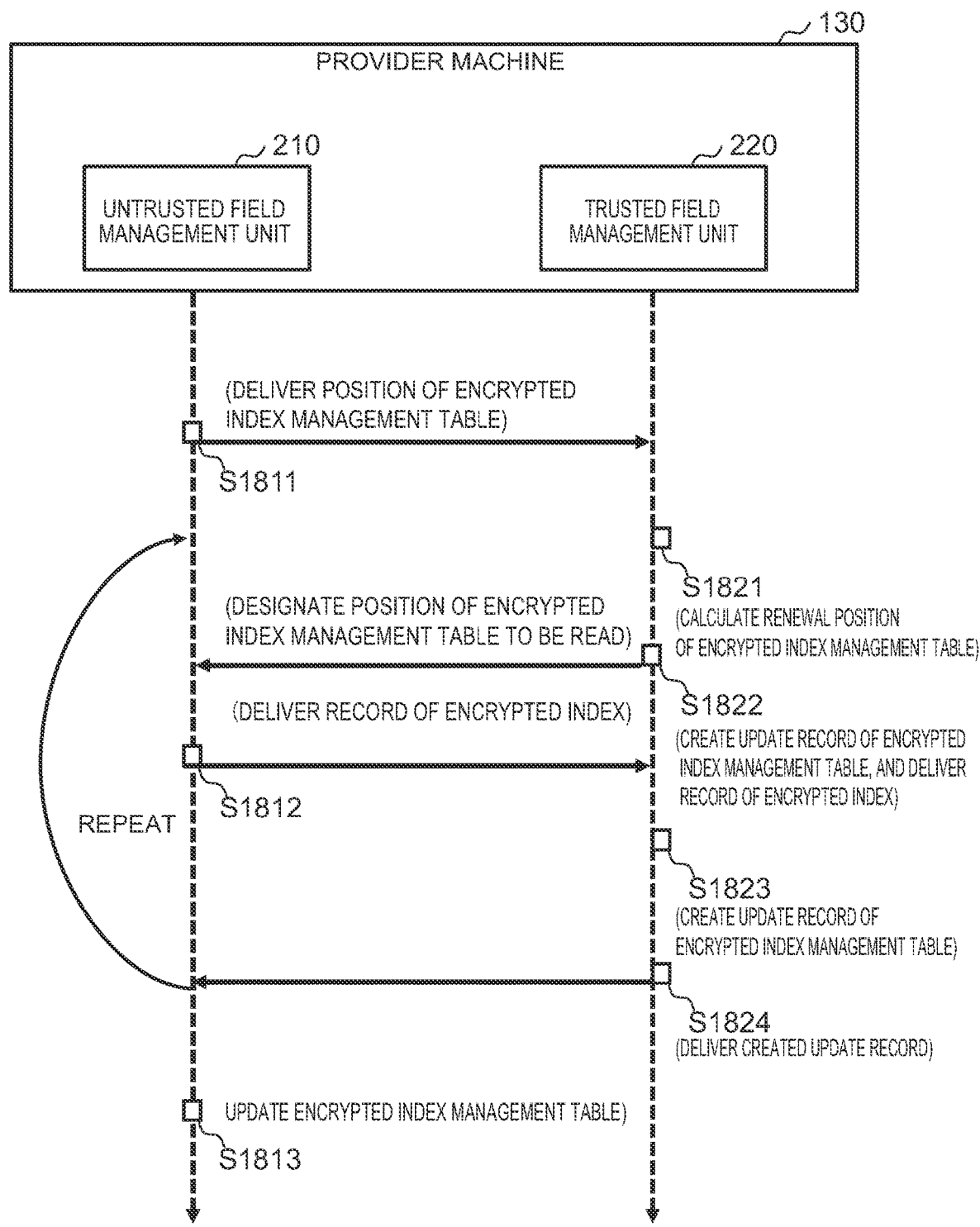
FIG. 18A is a diagram showing an example of the sequence diagram according to the first embodiment.

FIG. 18A is a diagram showing an example of the sequence diagram representing the exchange of data between the untrusted field management unit 210 and the trusted field management unit 220 of the provider machine 130 in the update processing.

In S1811, the untrusted field management unit 210 delivers, to the trusted field management unit 220, the position of the encrypted index management table 212 corresponding to the retrieval in S1712. For example, in the encrypted index management table 1400, when the insurer number "E (0145678901)" in the record of the fourth line is equal to the encrypted query, the position "2" in that record is delivered to the trusted field management unit 220.

In S1821, the trusted field management unit 220 calculates the update position of the encrypted index management table 212.

In the following explanation, the exchange of data in S1822 to S1823 is repeated a certain number of times.

In S1822, the trusted field management unit 220 instructs the position of the encrypted index management table 212 to the untrusted field management unit 210.

In S1812, the untrusted field management unit 210 delivers the record of the encrypted index that was instructed.

In S1823, the trusted field management unit 220 creates the update record of the encrypted index management table 212.

In S1824, the trusted field management unit 220 delivers the update record of the encrypted index management table 212 to the untrusted field management unit 210.

In S1813, the untrusted field management unit 210 updates the encrypted index management table 212.

The untrusted field management unit 210 and the trusted field management unit 220 coordinate and update the encrypted index management table 212 in the manner described above.

FIG. 18B and FIG. 18C are diagrams showing an example of the flowchart of the update processing. S1821-1 to S1821-3 are details of the processing of S1821. S1812-1 to S1812-2 are details of the processing of S1812. S1823-1 to S1823-11 are details of the processing of S1823.

In S1821-1, the trusted field management unit 220 stores the position of the acquired encrypted index management table 212 in a variable pos.

In S1821-2, the trusted field management unit 220 proceeds to the processing of S1822 when the variable pos is equal to or greater than N/2, and proceeds to the processing of S1821-3 when the variable pos is less than N/2. Note that N is the sum total of the records of the encrypted index management table 212.

In S1821-3, the trusted field management unit 220 randomly generates a random bit r which takes on the value of "0" or "1". Furthermore, the trusted field management unit 220 doubles the variable pos, and updates the variable pos to the value to which the random bit r has been added. In other words, the trusted field management unit 220 deems pos ← 2 pos+r. The trusted field management unit 220 updates the variable pos, and thereafter returns to S1821-2.

In S1822, the trusted field management unit 220 copies the variable pos to a variable pos', and delivers the variable pos' to the untrusted field management unit 210.

In S1812-1, the untrusted field management unit 210 delivers, to the trusted field management unit 220, the record of the encrypted index management table 212 positioned at the same value as the variable pos'.

In S1812-2, the untrusted field management unit 210 updates to pos' ← [pos'/2], and returns to the processing of S1812-1 when pos'>0, and proceeds to the processing of S1823-1 when path≤0.

In S1823-1, the trusted field management unit 220 initializes the variable x, and stores [log (N)] in the variable h. In other words, the trusted field management unit 220 deems x ← 0 and h ← [log (N)]. Furthermore, the trusted field management unit 220 stores, in the variable path, the value obtained by subtracting [N/2] from pos'. In other words, the trusted field management unit 220 deems path ← pos'−[N/2]. The trusted field management unit 220 copies the value of the path to the variable y.

In S1823-2, the trusted field management unit 220 extracts the record having the highest position (pos) value from the records received in S1812-1. When S1823-2 is performed for the second time, the recording having the second highest pos value is extracted, and when S1823-2 is performed for the third time, the third highest pos value is extracted.

In S1823-3, the trusted field management unit 220 deletes the position (pos) from the record acquired in S1812, and adds a variable path to that record.

In S1823-4, the trusted field management unit 220 once decrypts the record, thereafter re-encrypts the record, and then stores the re-encrypted record in the substitution table 221. Since encryption is performed using a probabilistic method, the value of the encrypted data after being re-encrypted will differ from the previous value.

In S1823-5, the trusted field management unit 220 increments x by one, decrements h by one, and proceeds to the processing of S1823-7 when h<0, and proceeds to the processing of S1823-6 when h≥0.

In S1823-6, the trusted field management unit 220 randomly generates an integer which satisfies power (2, x 'path/2'−1)<y≤power (2, x 'path/2'), and stores the generated integer in the variable y. Subsequently, the trusted field management unit 220 returns to the processing of S1823-2.

In S1823-7, the trusted field management unit 220 once again initializes the variable x, and stores [log (N)] in the variable h. In other words, the trusted field management unit 220 deems x ← 0 and h ← [log (N)].

In S1823-8, the trusted field management unit 220 stores the value obtained by subtracting [N/2] from pos in the variable path. In other words, the trusted field management unit 220 deems path ← pos−[N/2]. Moreover, the trusted field management unit 220 copies the value of the path to the variable y.

In S1823-9, the trusted field management unit 220 randomly acquires a record having the same value as y from the substitution table 221, and deletes the acquired record from the substitution table 221.

In S1823-10, the trusted field management unit 220 increments x by one, decrements h by one, and proceeds to the processing of S1824 when h<0, and proceeds to the processing of S1823-11 when S1823-11.

In S1823-11, the trusted field management unit 220 randomly acquires a record which satisfies power (2, x 'path/2'−1)<path≤power (2, x 'path/2') from the substitution table 221, and then returns to the processing of S1823-9.

In S1824, the trusted field management unit 220 delivers all acquired records (update records of the encrypted index management table 212) to the untrusted field management unit 210.

In S1813, the untrusted field management unit 210 updates the records of the encrypted index management table 212. For example, the untrusted field management unit 210 overwrites the insurer number and the ID of the record of S1812-1 with the insurer number and the ID of S1823-9.

An example of the update processing is now explained with reference to FIG. 19 to FIG. 21.

FIG. 19 to FIG. 21 are diagrams showing an example of the encrypted index management table 212 stored in the untrusted field management unit 210 and the substitution table 221 stored in the trusted field management unit 220.

The encrypted index management table 1910 holds seven records, and each record is configured from a set of an insurer number as the retrieval keyword, an ID, and a position. Since N is the sum total of the records, N=7. The substitution table 1920 includes two records as dummy data, and each record is configured from a set of an insurer number, an ID, and a Path. In the following explanation, a case where the insurer number "E (0145678901)" in the record of the fourth line of the encrypted index management table 1910 is equal to the encrypted query is described.

In S1821-1, the trusted field management unit 220 of the provider machine 130 stores the position "2" of the acquired encrypted index management table 2110 in the variable pos.

In S1821-2, the trusted field management unit 220 proceeds to the processing of S1821-3 since the value "2" of the variable pos is less than N/2 (=7/2).

In S1821-3, the trusted field management unit 220 randomly generated a random bit r, and obtained a value "0" (r=0).

Furthermore, the trusted field management unit 220 doubles the value "2" of the variable pos, and sets the value to which random bit r=0 has been added as the variable pos. In other words, pos ← 2×2+0=4. The trusted field management unit 220 updates the variable pos, and thereafter proceeds to the processing of S1821-2.

In S1821-2, the trusted field management unit 220 proceeds to the processing of S1822 since the value "4" of the variable pos is equal to or greater than N/2 (=7/2).

In S1822, the trusted field management unit 220 deems variable pos' ← pos=4, and delivers variable pos'=4 to the untrusted field management unit 210.

Accordingly, in S1821-2 and S1821-3, the trusted field management unit 220 decides the path including the position where the encrypted data is stored (this path is hereinafter referred to as the "path to be updated"). For example, the path configured from a node of a position "4", a node of a position "2", and a node of a position "1" is decided. Note that, when a value "1" is obtained, another path (path configured from a node of a position "5", a node of a position "2", and a node of a position "1") is decided.

In S1812-1, the untrusted field management unit 210 delivers, to the trusted field management unit 220, the record of the encrypted index management table 1910 positioned at the value "4" of the variable pos'. In this example, the record corresponds to the record "E (3323456789), E (12, 13), 4" of the second line.

In S1812-2, the untrusted field management unit 210 deems pos' ← [pos'/2]=[4/2]=2, and returns to the processing of S1812-1 since pos'>0.

In S1812-1, the untrusted field management unit 210 delivers, to the trusted field management unit 220, the record of the encrypted index management table 1910 positioned at the value "2" of the variable pos'. In this example, the record corresponds to the record "E (0145678901), E (2, 4), 2" of the fourth line.

In S1812-2, the untrusted field management unit 210 deems pos' ← [pos'/2]=[2/2]=1, and returns to the processing of S1812-1 since pos'>0.

In S1812-1, the untrusted field management unit 210 delivers, to the trusted field management unit 220, the record of the encrypted index management table 212 positioned at the value "1" of the variable pos'. In the encrypted index management table 1910, the record corresponds to the record "E (0378901234), E (6, 7), 1" of the sixth line.

In S1812-2, the untrusted field management unit 210 deems pos' ← [pos'/2]=[1/2]=0, and proceeds to the processing of S1823-1 since pos'≤0.

Accordingly, in S1812-1 and S1812-2, the untrusted field management unit 210 identifies the record of the encrypted index management table 212 pertaining to the path to be updated, and delivers the identified record to the trusted field management unit 220. In this example, the record of the second line, the record of the fourth line and the record of the sixth line of the encrypted index management table 1910 are delivered to the trusted field management unit 220.

In S1823-1, the trusted field management unit 220 initializes the variable x, and stores [log (7)] in the variable h. In other words, the trusted field management unit 220 deems x ← 0 and h ← [log (N)]=2. Furthermore, the trusted field management unit 220 stores pos[N/2] in the variable path. In other words, the trusted field management unit 220 deems path ← pos−[N/2]=4−[7/2]=1. The value of the variable y is deemed y ← path=1.

In S1823-2, the trusted field management unit 220 extracts the record having the highest position (pos) value from the records received in S1812-1.

In S1823-3, the trusted field management unit 220 deletes position (pos)=4 from that record, and adds y=1 as the variable path.

In S1823-4, the trusted field management unit 220 decrypts, and then re-encrypts, the insurer number and the ID of that record, and stores the re-encrypted insurer number and ID in the substitution table 2020. In the substitution table 2020, this corresponds to the record storing the record "E (3323456789), E (12, 13), 1" of the third line.

In S1823-5, the trusted field management unit 220 deems x ← x+1=0+1=1, h ← 2−1=1, and proceeds to the processing of S1823-6 since h≥0.

In S1823-6, the trusted field management unit 220 randomly generates an integer which satisfies power (2, x 'path/2'−1)<y≤power (2, x 'path/2'), and stores the generated integer in the path.
power (2, x 'path/2'−1)=power (2, '½'−1)=power (2, 0)=$2^0$=1
power (2, x 'path/2')=power (2, '½')=power (2, 1)=$2^1$=2
The trusted field management unit 220 randomly generates an integer which satisfies 1<y≤2, and deems y=2. The trusted field management unit 220 returns to the processing of S1823-2.

In S1823-2, the trusted field management unit 220 extracts the record with the second highest pos value.

In S1823-3, the trusted field management unit 220 deletes position (pos)=2 from that record, and adds y=2 as the variable path.

In S1823-4, the trusted field management unit 220 decrypts, and then re-encrypts, the insurer number and the ID of that record, and stores the re-encrypted insurer number and ID in the substitution table 2020. In the substitution table 2020, this corresponds to the record storing the record "E (0145678901), E (2, 4), 2" of the fourth line.

Accordingly, in updating the path, a path is randomly selected from the paths containing the position of that record. For example, since the node of the position "2" is included in the path "1" or the path "2", one of either the path "1" or the path "2" is randomly selected as the updated path.

In S1823-5, the trusted field management unit 220 deems x ← x+1=1+1=2, h ← 1−1=0, and proceeds to the processing of S1823-6 since h≥0.

In S1823-6, the trusted field management unit 220 randomly generates an integer which satisfies power (2, x 'path/2'−1)<y power (2, x 'path/2'), and stores the generated integer in the path.
power (2, x 'path/2'−1)=power (2, 2 '½'−1)=power (2, 0)=$2^0$=1
power (2, x 'path/2')=power (2, 2 '½')=power (2, 2)=$2^2$=4
The trusted field management unit 220 randomly generates an integer which satisfies 1<y≤4, and deems y=3. The trusted field management unit 220 returns to the processing of S1823-2.

In S1823-2, the trusted field management unit 220 extracts the record having the third highest pos value.

In S1823-3, the trusted field management unit 220 deletes position (pos)=1 from that record, and adds y=3 as the variable path.

In S1823-4, the trusted field management unit 220 decrypts, and then re-encrypts, the insurer number and the ID of that record, and stores the re-encrypted insurer number and ID in the substitution table 2020. In the substitution table 2020, this corresponds to the record storing the record "E (0378901234), E (6, 7), 3" of the fifth line.

For example, since the node of the position "1" is included in any one of the path "1" to the path "4", one path is randomly selected among the path "1" to the path "4" as the updated path.

In S1823-5, the trusted field management unit 220 deems x ← x+1=2+1=3, h ← 0−1=−1, and proceeds to the processing of S1823-7 since h<0.

Note that the method of deciding the updated path is not limited to the foregoing method, and, for example, a method of randomly deciding the updated path among all paths, irrespective of the position of the nodes, may also be adopted.

In S1823-7, the trusted field management unit 220 once again initializes the variable x, and stores [log (N)] in the variable h. In other words, the trusted field management unit 220 deems x ← 0 and h ← [log (N)]=[log (7)]=2.

In S1823-8, the trusted field management unit 220 stores pos−[n/2]=4−[7/2]=1 in the variable path, and deems variable y=1.

In S1823-9, the trusted field management unit 220 randomly acquires a record having the same value as y from the substitution table 2020, and deletes the acquired record from the substitution table 2020. Furthermore, the trusted field management unit 220 may also deliver the acquired record to the untrusted field management unit 210. In the substitution table 2020, let it be assumed that the trusted field management unit 220 acquired the record "E (1267890123), E (1, 2), 1" of the first line.

In S1823-10, the trusted field management unit 220 deems x ← x+1=0+1=1, h ← 2−1=1, and proceeds to the processing of S1823-11 since h≥0.

In S1823-11, the trusted field management unit 220 randomly generates an integer which satisfies power (2, x 'path/2'−1)<y power (2, x 'path/2'), and stores the generated integer in the path.
power (2, x 'path/2'−1)=power (2, '½'−1)=power (2, 0)=$2^0$=1
power (2, x 'path/2')=power (2, '½')=power (2, 1)=$2^1$=2
The trusted field management unit 220 randomly generates an integer which satisfies 1<y≤2, and deems y=2. The trusted field management unit 220 returns to the processing of S1823-9.

In S1823-9, the trusted field management unit 220 randomly acquires a record having the same value as y=2 from the substitution table 2020, and deletes the acquired record from the substitution table 2020. Furthermore, the trusted field management unit 220 may also deliver the acquired record to the untrusted field management unit 210. In the substitution table 2020, the trusted field management unit 220 acquires the record "E (1378901234), E (14, 15), 2" of the second line.

Accordingly, one record of the corresponding path is acquired from the substitution table 221 targeting all paths including the position of the record to be updated in the encrypted index management table 212. For example, when the position of the record to be updated in the encrypted index management table 2010 is "2", since the path including the node having the position of "2" is either the path "1" or the path "2", one record (record of the second line in this example) is randomly acquired among the records in which the path is "1" or "2" from the substitution table 2020.

In S1823-10, the trusted field management unit 220 deems x ← x+1=1+1=2, h ← 1−1=0, and proceeds to the processing of S1823-11 since h≥0.

In S1823-11, the trusted field management unit 220 randomly generates an integer which satisfies power (2, x 'path/2'−1)<y power (2, x 'path/2'), and stores the generated integer in the path.
power (2, 2 'path/2'−1)=power (2, 2 '½'−1)=power (2, 0)=$2^0$=1
power (2, 2 'path/2')=power (2, 2 '½')=power (2, 1)=$2^2$=4
The trusted field management unit 220 randomly generates an integer which satisfies 1<y≤4, and deems y=3. The trusted field management unit 220 returns to the processing of S1823-9.

In S1823-9, the trusted field management unit 220 randomly acquires a record having the same value as y=3 from the substitution table 2020, and deletes the acquired record from the substitution table 2020. Furthermore, the trusted field management unit 220 may also deliver the acquired record to the untrusted field management unit 210. In the substitution table 2020, let it be assumed that the record "E (0378901234), E (6, 7), 3" of the fifth line has been acquired.

For example, when the position of the record to be updated in the encrypted index management table 2010 is "1", since the path including the node having the position of "1" is any one of the path "1" to the path "4", one record (record of the fifth line in this example) is randomly acquired among the records in which the path is any one of "1" to "4" from the substitution table 2020.

In S1813, the untrusted field management unit 210 overwrites the insurer number and the ID of the record of S1812-1 with the insurer number and the ID of the record of S1823-9.

In the foregoing example, the encrypted index management table 1910 becomes the encrypted index management table 2110 based on the update processing. Moreover, the substitution table 1920 becomes the substitution table 2120 based on the update processing.

Accordingly, as a result of the untrusted field management unit 210 retrieving an encrypted index and thereafter reading a plurality of records, which include a record equivalent to the retrieval result from the encrypted index, into the trusted field management unit 220, decrypting, and then re-encrypting, that record and randomly shuffling such record with the record of the substitution table 221, and updating the encrypted index of the untrusted field management unit 210, it is possible to conceal the retrieval frequency from the service provider that can only browse the untrusted field management unit 210. Consequently, it is possible to resolve the problem of original data being leaked from the retrieval frequency, and the medical institution or the medical researcher as the user can use the retrieval function of the provider machine 130 with a sense of security without having to worry about the leakage of information.

(2) Supplementary Notes

While the foregoing embodiment explained a case of applying the present invention to a retrieval system, the present invention is not limited thereto, and may be broadly applied to various other systems, devices, methods, and programs.

Moreover, while the foregoing embodiment explained a case of adopting the substitution table 221 for updating the encrypted index management table 212, the present invention is not limited thereto. For example, a substitution table may also be adopted for updating the encrypted database. In the foregoing case, for example, an encrypted retrieval keyword that was decrypted and then re-encrypted is managed in the substitution table, and the encrypted retrieval keyword of the encrypted database is updated with the encrypted retrieval keyword that was re-encrypted. Moreover, for example, a column of "position" may be provided in the encrypted database. In the foregoing case, the trusted field management unit 220 will comprise a binary partition tree or a multi-branch tree for managing the storage position of the encrypted data stored in the encrypted database. The bucket of the foregoing tree may include a plurality of encrypted retrieval keywords as the management data. According to the foregoing configuration, since the position or data content of the encrypted data of the encrypted database will be shuffled at random, for example, the deciphering of the frequency of the retrieval result can be made difficult.

Moreover, while the foregoing embodiment explained a case of the untrusted field management unit 210 sending, to the browsing machine 140, the encrypted data of the encrypted retrieval keyword among the encrypted data received from the trusted field management unit 220, the present invention is not limited thereto. For example, the untrusted field management unit 210 may send all of the encrypted data received from the trusted field management unit 220 to the browsing machine 140, and the browsing machine 140 may identify the encrypted data of the encrypted retrieval keyword.

Moreover, while the foregoing embodiment explained a case of the untrusted field management unit 210 delivering the encrypted ID to the trusted field management unit 220 and acquiring the encrypted data, the present invention is not limited thereto. For example, the untrusted field management unit 210 may return the encrypted ID to the browsing machine 140, and the browsing machine 140 may send an ID group, in which the encrypted ID and the encrypted ID of the same set as such encrypted ID are decrypted, to the provider machine, and thereby acquire the encrypted data.

Moreover, in the foregoing embodiment, the configuration of the respective tables is merely an example, and one table may be divided into two or more tables, or all or a part of two or more tables may be one table.

Moreover, in the foregoing embodiment, while the expression "XX table" was used to explained the various types of data for the sake of convenience in explaining the present invention, there is no particular limitation to the data structure, and an expression such as "XX information" may also be used.

Moreover, in the foregoing explanation, information, such as programs, tables, files or the like, for realizing the respective functions may be recorded in a memory, a hard disk, an SSD (Solid State Drive) or any other storage device, or may otherwise be recorded on an IC card, an SD card, a DVD or any other storage medium.

Also, the information may also be installed from an information source. The information source may be, for example, an information distribution computer or a computer-readable recording medium (for instance, a non-transitory recording medium). The explanation of the respective functions is merely an example, and a plurality of functions may be consolidated into one function, or one function may be divided into a plurality of functions.

The foregoing embodiment, for example, comprises the following characteristic configurations.

A retrieval system (for example, retrieval system 100) comprising a provider machine (for example, provider machine 130) which performs a retrieval in response to an encrypted query (for example, encrypted query 1000) as an encrypted version of a query from a browsing machine (for example, browsing machine 140) for browsing encrypted data as an encrypted version of data, and provides a retrieval result to the browsing machine, wherein the retrieval system additionally comprises a first management unit (for example, trusted field management unit 220) which stores, in a first storage area (for example, trusted field; this may also be a storage area of the browsing machine 140) that cannot be browsed by an administrator of the provider machine, management information (for example, substitution table 221) in which an encrypted retrieval keyword (for example, encrypted insurer number) as an encrypted version of a retrieval keyword used for the retrieval performed by the provider machine, and an encrypted ID (for example, ID that has been encrypted), which is associated with the encrypted retrieval keyword, as an encrypted version of identifying information capable of identifying the encrypted data, are associated, and, of the management information, decrypts, and then once again encrypts, the encrypted retrieval keyword corresponding to the encrypted query from the browsing machine and the encrypted ID corresponding to the encrypted retrieval keyword, and a second management unit (for example, untrusted field management unit 210) which stores, in a second storage area (for example, untrusted field; this may also be a trusted field), index information (for example, encrypted index management table 212) in which the encrypted retrieval keyword used for the retrieval performed by the provider machine, and one or more encrypted IDs associated with the encrypted retrieval keyword, are associated, and, of the index information, updates the encrypted retrieval keyword and the encrypted ID (for example, updates the position and/or data content) corresponding to the encrypted query from the browsing machine to the encrypted retrieval keyword and the encrypted ID which were decrypted and then encrypted by the first management unit.

With the foregoing configuration, the encrypted retrieval keyword and the encrypted ID are re-encrypted in an area that cannot be browsed by the administrator, and the index information is updated with the encrypted retrieval keyword and the encrypted ID that were re-encrypted. As a result of updating the index information in the foregoing manner, for example, the deciphering of the frequency of the retrieval result can be made difficult. According to the foregoing configuration, for example, it is possible to avoid a situation where the original data is leaked based on the frequency of retrieval. Moreover, as a result of the retrieval of encrypted data being performed safely, the user of the provider machine can entrust data to the provider machine with a sense of security without having to worry about the leakage of information.

The first management unit manages the encrypted retrieval keyword used for the retrieval performed by the provider machine and the one or more encrypted IDs associated with the encrypted retrieval keyword as a set (for example, path in a tree structure) including a plurality of combinations thereof, and, of the management information, changes at least one encrypted retrieval keyword and encrypted ID (these may be the encrypted retrieval keyword and the encrypted ID of the management date included in a bucket of all nodes included in the corresponding path, or the encrypted retrieval keyword and the encrypted ID of the management date included in a bucket of certain nodes included in the corresponding path) from the set including the encrypted retrieval keyword corresponding to the encrypted query from the browsing machine to another encrypted retrieval keyword and encrypted ID included in the management information, and the second management unit, of the index information, updates the at least one encrypted retrieval keyword and encrypted ID to the other encrypted retrieval keyword and encrypted ID.

With the foregoing configuration, since the position and/or data content of the encrypted retrieval keyword and the encrypted ID in the index information are shuffled at random, for example, the deciphering of the frequency of the retrieval result can be made difficult.

The management information includes a dummy encrypted retrieval keyword and a dummy encrypted ID (for example, refer to FIG. 19).

With the foregoing configuration, since a dummy encrypted retrieval keyword and a dummy encrypted ID are included in the index information, for example, the deciphering of the frequency of the retrieval result can be made difficult.

The browsing machine and the provider machine share an encryption key (for example, common key used in the common key encryption method, secret key used in the public key encryption method, etc.) to be used for encryption and decryption, the first storage area is provided in the provider machine, the first management unit stores the encryption key in the first storage area (for example, refer to FIG. 2).

With the foregoing configuration, in the provider machine, the encryption key is stored in the first storage area that cannot be browsed by the administrator of the provider machine. According to the foregoing configuration, for example, since it is possible to avoid a situation where the administrator of the provider machine fraudulently acquires the encryption key, the leakage of information can be more strongly prevented.

The retrieval system further comprises a storage unit (for example, encrypted database 211) which stores a plurality of data (for example, records) in which encrypted data as an encrypted version of data, and an encrypted retrieval keyword used for retrieving the encrypted data, are associated, and the second management unit, of the data stored in the storage unit, updates the encrypted retrieval keyword corresponding to the encrypted query from the browsing machine to an encrypted retrieval keyword as the encrypted retrieval keyword which was decrypted and then encrypted by the first management unit.

With the foregoing configuration, since the contents of the encrypted data are updated each time they are retrieved, for example, the deciphering of the frequency of the retrieval result can be made difficult.

The retrieval system further comprises a storage unit (for example, encrypted database 211) which stores a plurality of data in which encrypted data as an encrypted version of data, an encrypted retrieval keyword used for retrieving the encrypted data, and an ID as identifying information capable of identifying the encrypted data and the encrypted retrieval keyword, are associated, and the second management unit uses the index information and delivers, to the first management unit, an encrypted ID associated with the same encrypted retrieval keyword as the encrypted query from the browsing machine (for example, refer to S1711 to S1713), the first management unit manages the encrypted retrieval keyword used for the retrieval performed by the provider machine and the one or more encrypted IDs associated with the encrypted retrieval keyword as a set including a plurality of combinations thereof, decrypts the encrypted ID received from the second management unit and the encrypted ID of the set including the encrypted ID, and delivers the encrypted data identified with the decrypted ID to the second management unit (for example, refer to S1721 to S1723), and the second management unit, of the encrypted data received from the first management unit, sends the encrypted data of the encrypted retrieval keyword to the browsing machine (for example, refer to S1632).

According to the foregoing configuration, for example, in comparison to the case of returning the encrypted ID to the browsing machine, and the browsing machine sending an ID group, in which the encrypted ID and the encrypted ID of the same set as such encrypted ID are decrypted, to the provider machine, and thereby acquiring the encrypted data, the deciphering of the frequency of the retrieval result can be made difficult without having to increase the number of communications between the provider machine and the browsing machine.

The provider machine comprises a device equipped with a TEE function (for example, CPU 1110 comprising a TEE function), the first storage area is provided in the provider machine, and the first storage area is allocated in a memory (for example, memory 1120) based on the TEE function.

According to the foregoing configuration, the deciphering of the frequency of the retrieval result can be made difficult without having to increase the number of communications between the provider machine and the browsing machine.

The first storage area and first management unit are provided in the browsing machine.

According to the foregoing configuration, the deciphering of the frequency of the retrieval result can be made difficult without having to use a device comprising a TEE function.

Note that the present invention is not limited to the embodiment described above, and may be modified variously so as long as the modification does not deviate from the subject matter of the present invention. For example, the foregoing embodiment was explained in detail for explaining the present invention in an easy-to-understand manner, and the present invention does not need to necessarily comprise all of the configurations explained in the embodiment. Moreover, a part of the configuration of a certain embodiment may be replaced with the configuration of another embodiment, and the configuration of another embodiment may be added to the configuration of one embodiment. Moreover, another configuration may be added to, deleted from or replaced with a part of the configuration of each embodiment.

Moreover, the value of data is not limited to an integer, and may also be a real number.

Moreover, a part or all of the respective configurations, functions, processing units, and processing means described above may be realized with hardware such as an integrated circuit. Moreover, the respective configurations, functions, processing units, and processing means described above may also be realized with software as a result of a processor interpreting and executing programs that realize the respective functions. The information of programs, tables and files for realizing the respective functions may be recorded in a memory, a hard disk, an SSD (Solid State Drive) or any other storage device, or may otherwise be recorded on an IC card, an SD card, a DVD or any other storage medium.

Moreover, control lines and information lines are illustrated to the extent required for explaining the present invention, and not all control lines and information lines required for the product may necessarily be indicated. In effect, it may be understood that nearly all of the configurations are mutually connected.

Moreover, the foregoing configurations may be suitably changed, rearranged, combined or omitted to the extent that such change, rearrangement, combination or omission does not exceed the subject matter of the present invention.

Items included in a list according to a format of "at least one among A, B, and C" should be understood to mean (A), (B), (C), (A and B), (A and C), (B and C) or (A, B, and C). Similarly, items included in a list according to a format of "at least one among A, B, or C" should be understood to mean (A), (B), (C), (A and B), (A and C), (B and C) or (A, B, and C).

Although the present disclosure has been described with reference to example embodiments, those skilled in the art will recognize that various changes and modifications may be made in form and detail without departing from the spirit and scope of the claimed subject matter.

What is claimed is:

1. A retrieval system comprising a provider machine which performs a retrieval in response to an encrypted query as an encrypted version of a query from a browsing machine for browsing encrypted data as an encrypted version of data, and provides a retrieval result to the browsing machine, the retrieval system comprising:
 a first management central processing unit (CPU)
  stores, in a first storage area that cannot be browsed by an administrator of the provider machine, management information including
 a first encrypted retrieval keyword as an encrypted version of a retrieval keyword used for the retrieval performed by the provider machine, and
 an encrypted ID, which is associated with the first encrypted retrieval keyword, as an encrypted version of identifying information capable of identifying the encrypted data, and
  decrypts and then once again encrypts, the first encrypted retrieval keyword corresponding to the encrypted query and the encrypted ID corresponding to the first encrypted retrieval keyword, creating a second encrypted retrieval keyword and a second encrypted ID; and
 a second management central processing unit (CPU)
  stores, in a second storage area, index information including the first encrypted retrieval keyword and one or more encrypted IDs associated with the first encrypted retrieval keyword, and
  updates the first encrypted retrieval keyword and the encrypted ID to the second encrypted retrieval keyword and the second encrypted ID which were decrypted and then encrypted by the first management CPU, wherein the management information and the encrypted ID are associated, and wherein the index information and the one or more encrypted IDs are associated.

2. The retrieval system according to claim 1, wherein:
the first management CPU
    manages the first encrypted retrieval keyword and the one or more encrypted IDs as a set including a plurality of combinations thereof, and
    changes at least one encrypted retrieval keyword and the encrypted ID from the management information including the encrypted retrieval keyword to another encrypted retrieval keyword and another encrypted ID included in the management information; and
the second management CPU updates the at least one encrypted retrieval keyword and the encrypted ID to the other encrypted retrieval keyword and the other encrypted ID.

3. The retrieval system according to claim 2,
wherein the management information includes a dummy encrypted retrieval keyword and a dummy encrypted ID.

4. The retrieval system according to claim 1, wherein:
the browsing machine and the provider machine share an encryption key to be used for encryption and decryption;
the first storage area is provided in the provider machine; and
the first management CPU stores the encryption key in the first storage area.

5. The retrieval system according to claim 1, further comprising:
a storage unit which stores a plurality of data in which the encrypted data, and the first encrypted retrieval keyword are associated,
wherein the second management CPU updates the first encrypted retrieval keyword to another encrypted retrieval keyword as the second encrypted retrieval keyword.

6. The retrieval system according to claim 1, further comprising:
a storage unit which stores a plurality of data in which the encrypted data, the first encrypted retrieval keyword, and an ID as identifying information capable of identifying the encrypted data and the first encrypted retrieval keyword,
wherein:
    the second management CPU uses the index information and delivers, to the first management CPU, the encrypted ID associated with the first encrypted retrieval keyword as the encrypted query from the browsing machine;
    the first management CPU
        manages the first encrypted retrieval keyword and the one or more encrypted IDs as a set including a plurality of combinations thereof,
        decrypts the encrypted ID received from the second management CPU and an encrypted ID from the one or more encrypted IDs of the set, creating a decrypted ID, and
        delivers the encrypted data identified with the decrypted ID to the second management CPU; and
    the second management CPU sends the encrypted data of the first encrypted retrieval keyword to the browsing machine.

7. The retrieval system according to claim 1, wherein:
the provider machine comprises a device equipped with a TEE function;
the first storage area is provided in the provider machine; and
the first storage area is allocated in a memory based on the TEE function.

8. The retrieval system according to claim 1,
wherein the first storage area and first management CPU are provided in the browsing machine.

9. A retrieval device which performs a retrieval in response to an encrypted query as an encrypted version of a query from a browsing machine for browsing encrypted data as an encrypted version of data, and provides a retrieval result to the browsing machine,
the retrieval device comprising:
    a first management central processing unit (CPU)
        stores, in a first storage area that cannot be browsed by an administrator of the retrieval device, management information including
            a first encrypted retrieval keyword as an encrypted version of a retrieval keyword used for the retrieval performed by the retrieval device, and
            an encrypted ID, which is associated with the first encrypted retrieval keyword, as an encrypted version of identifying information capable of identifying the encrypted data, and
        decrypts and then once again encrypts, the first encrypted retrieval keyword corresponding to the encrypted query and the encrypted ID corresponding to the first encrypted retrieval keyword, creating a second encrypted retrieval keyword and a second encrypted ID; and
    a second management CPU
        stores, in a second storage area, index information including the first encrypted retrieval keyword and one or more encrypted IDs associated with the first encrypted retrieval keyword, and
        updates the first encrypted retrieval keyword and the encrypted ID to the second encrypted retrieval keyword and the second encrypted ID which were decrypted and then encrypted by the first management CPU,
wherein the management information and the encrypted ID are associated, and
wherein the index information and the one or more encrypted IDs are associated.

10. A retrieval method in a retrieval system comprising a provider machine which performs a retrieval in response to an encrypted query as an encrypted version of a query from a browsing machine for browsing encrypted data as an encrypted version of data, and provides a retrieval result to the browsing machine, the retrieval method comprising the steps of:
    storing, via a first management central processing unit (CPU) in a first storage area that cannot be browsed by an administrator of the provider machine, management information including
        a first encrypted retrieval keyword as an encrypted version of a retrieval keyword used for the retrieval performed by the provider machine, and
        an encrypted ID, which is associated with the first encrypted retrieval keyword, as an encrypted version of identifying information capable of identifying the encrypted data;
    decrypting, and then once again encrypting, via the first management CPU, the first encrypted retrieval keyword corresponding to the encrypted query and the encrypted ID corresponding to first the encrypted retrieval keyword, creating a second encrypted retrieval keyword and a second encrypted ID;
    storing, via a second management CPU in a second storage area, index information including the first encrypted retrieval keyword and one or more encrypted IDs associated with the first encrypted retrieval keyword; and
updating the first encrypted retrieval keyword and the encrypted ID to the second encrypted retrieval keyword and the second encrypted ID which were decrypted and then encrypted by the first management CPU, and
wherein the management information and the encrypted ID are associated,
wherein the index information and the one or more encrypted IDs are associated.

\* \* \* \* \*